United States Patent
Shelton et al.

(10) Patent No.: US 12,471,992 B2
(45) Date of Patent: Nov. 18, 2025

(54) LASER COMBINATION WITH IN VIVO TARGET FEEDBACK ANALYSIS

(71) Applicant: GYRUS ACMI, INC., Westborough, MA (US)

(72) Inventors: Kurt G. Shelton, Bedford, MA (US); Sergey A. Bukesov, Acton, MA (US)

(73) Assignee: Gyrus ACMI, Inc., Westborough, MA (US)

( * ) Notice: Subject to any disclaimer, the term of this patent is extended or adjusted under 35 U.S.C. 154(b) by 476 days.

(21) Appl. No.: 18/046,534

(22) Filed: Oct. 14, 2022

(65) Prior Publication Data
US 2023/0131637 A1    Apr. 27, 2023

Related U.S. Application Data

(60) Provisional application No. 63/270,730, filed on Oct. 22, 2021.

(51) Int. Cl.
*A61B 1/06* (2006.01)
*A61B 1/00* (2006.01)
(Continued)

(52) U.S. Cl.
CPC .......... *A61B 18/24* (2013.01); *A61B 1/00009* (2013.01); *A61B 1/043* (2013.01);
(Continued)

(58) Field of Classification Search
None
See application file for complete search history.

(56) References Cited

U.S. PATENT DOCUMENTS

| 4,641,650 A | * | 2/1987 | Mok | ...................... A61B 18/20 600/478 |
| 9,757,199 B2 | | 9/2017 | Chia et al. | |

(Continued)

FOREIGN PATENT DOCUMENTS

| DE | 102022126875 A1 | 4/2023 |
| JP | H01135368 | 5/1989 |

(Continued)

OTHER PUBLICATIONS

"Japanese Application Serial No. 2022-169391, Response filed Mar. 10, 2025 to Notification of Reasons for Rejection mailed Dec. 9, 2024", w current English claims, 8 pgs.

(Continued)

*Primary Examiner* — John P Leubecker
(74) *Attorney, Agent, or Firm* — Schwegman Lundberg & Woessner, P.A.

(57) ABSTRACT

A laser can be controlled based on different tissue compositions, such as in real time. After a first time period, a first composition of a in vivo target site can be identified. Based on the first composition, a plurality of lasers can be controlled to emit light at a first wavelength where controlling includes activating a first combination of the plurality of lasers. After a second time period, a second composition of the in vivo target site different from the first composition can be identified. Based on the second composition, a plurality of lasers can be controlled to emit light at a second wavelength, such as can include activating a second combination of the plurality of lasers. The first combination of the plurality of lasers can be different from the second combination of the plurality of lasers.

12 Claims, 18 Drawing Sheets

(51) Int. Cl.
   *A61B 1/04*     (2006.01)
   *A61B 18/20*    (2006.01)
   *A61B 18/24*    (2006.01)
   *A61B 17/00*    (2006.01)
   *A61B 18/00*    (2006.01)

(52) U.S. Cl.
   CPC .. *A61B 1/0653* (2013.01); *A61B 2017/00061* (2013.01); *A61B 2018/00577* (2013.01); *A61B 2018/00654* (2013.01); *A61B 2018/00708* (2013.01); *A61B 2018/00904* (2013.01); *A61B 2018/00982* (2013.01); *A61B 2018/20553* (2017.05); *A61B 2018/208* (2013.01)

(56)           References Cited

U.S. PATENT DOCUMENTS

| | | | |
|---|---|---|---|
| 10,219,863 B2 | 3/2019 | Yu et al. | |
| 10,617,470 B2* | 4/2020 | Xuan | A61B 18/22 |
| 10,639,498 B2 | 5/2020 | Enwemeka et al. | |
| 10,675,481 B1 | 6/2020 | Tankovich | |
| 11,109,911 B2* | 9/2021 | Brown | A61B 18/26 |
| 2003/0109860 A1* | 6/2003 | Black | A61B 18/20 606/17 |
| 2011/0270092 A1 | 11/2011 | Kang et al. | |
| 2013/0123648 A1* | 5/2013 | Stampoulidis | A61N 5/062 600/478 |
| 2015/0230864 A1* | 8/2015 | Xuan | A61B 18/22 606/2.5 |
| 2015/0289937 A1* | 10/2015 | Chia | A61B 1/00009 606/2.5 |
| 2016/0135892 A1* | 5/2016 | Yu | A61B 1/0638 606/11 |
| 2016/0361120 A1* | 12/2016 | Brinkmann | A61B 18/20 |
| 2018/0280723 A1 | 10/2018 | Enwemeka et al. | |
| 2018/0344405 A1* | 12/2018 | Brown | A61B 18/22 |
| 2020/0158620 A1 | 5/2020 | Iizuka et al. | |
| 2020/0397351 A1 | 12/2020 | Miyata | |
| 2021/0038064 A1 | 2/2021 | Shelton et al. | |
| 2021/0045812 A1* | 2/2021 | Talbot | A61B 1/126 |
| 2022/0218415 A1* | 7/2022 | Lamrini | A61B 5/201 |
| 2022/0221334 A1* | 7/2022 | Bell | G01J 1/0425 |
| 2023/0126066 A1 | 4/2023 | Shelton et al. | |
| 2024/0189028 A1* | 6/2024 | Manstein | A61B 18/1477 |
| 2024/0261023 A1* | 8/2024 | Quesson | A61B 18/22 |

FOREIGN PATENT DOCUMENTS

| | | |
|---|---|---|
| JP | H05219938 | 8/1993 |
| JP | 2004008412 A | 1/2004 |
| JP | 2011167344 A | 9/2011 |
| JP | 2013094348 | 5/2013 |
| JP | 2015009031 A | 1/2015 |
| JP | 2021001916 A | 1/2021 |
| WO | WO-2011036792 A1 | 3/2011 |

OTHER PUBLICATIONS

"Japanese Application Serial No. 2022-169390, Response filed Feb. 13, 2024 to Notification of Reasons for Refusal mailed Nov. 13, 2023", W English Claims, 10 pgs.

"Japanese Application Serial No. 2022-169391, Notification of Reasons for Rejection mailed Jan. 15, 2024", W/English Translation, 9 pgs.

"Japanese Application Serial No. 2022-169391, Response filed Jun. 17, 2024 to Notification of Reasons for Rejection mailed Jan. 15, 2024", w/ current English claims, 11 pgs.

"Japanese Application Serial No. 2022-169391, Response filed Nov. 5, 2024 to Final Notification of Reasons for Rejection mailed Aug. 5, 2024", w english claims, 8 pgs.

"Japanese Application Serial No. 2022-169390, Response filed Sep. 2, 2024 to Examiners Decision of Final Refusal mailed Apr. 30, 2024", w current English claims, 16 pgs.

"Japanese Application Serial No. 2022-169391, Notification of Reasons for Rejection mailed Dec. 9, 2024", W English Translation, 5 pgs.

"Japanese Application Serial No. 2022-169391, Final Notification of Reasons for Rejection mailed Aug. 5, 2024", W English Translation, 5 pgs.

"Japanese Application Serial No. 2022-169390, Notification of Reasons for Refusal mailed Nov. 13, 2023", w English Translation, 17 pgs.

"Japanese Application Serial No. 2022-169390, Examiners Decision of Final Refusal mailed Apr. 30, 2024", w English translation, 8 pgs.

"U.S. Appl. No. 18/046,539, Examiner Interview Summary mailed May 15, 2025", 2 pgs.

"U.S. Appl. No. 18/046,539, Response filed Jun. 24, 2025 to Non Final Office Action mailed Mar. 24, 2025", 10 pgs.

"U.S. Appl. No. 18/046,539, Non Final Office Action mailed Mar. 24, 2025", 21 pgs.

English Translation of JP 2011167344 A, (2011).

English Translation of JPWO201136792 A1, (2011).

"U.S. Appl. No. 18/046,539, Notice of Allowance mailed Sep. 30, 2025", 11 pgs.

"U.S. Appl. No. 18/046,539, Corrected Notice of Allowability mailed Oct. 15, 2025", 2 pgs.

"Japanese Application Serial No. 2024-150787, Notification of Reasons for Refusal mailed Sep. 16, 2025", W English Translation, 11 pgs.

* cited by examiner

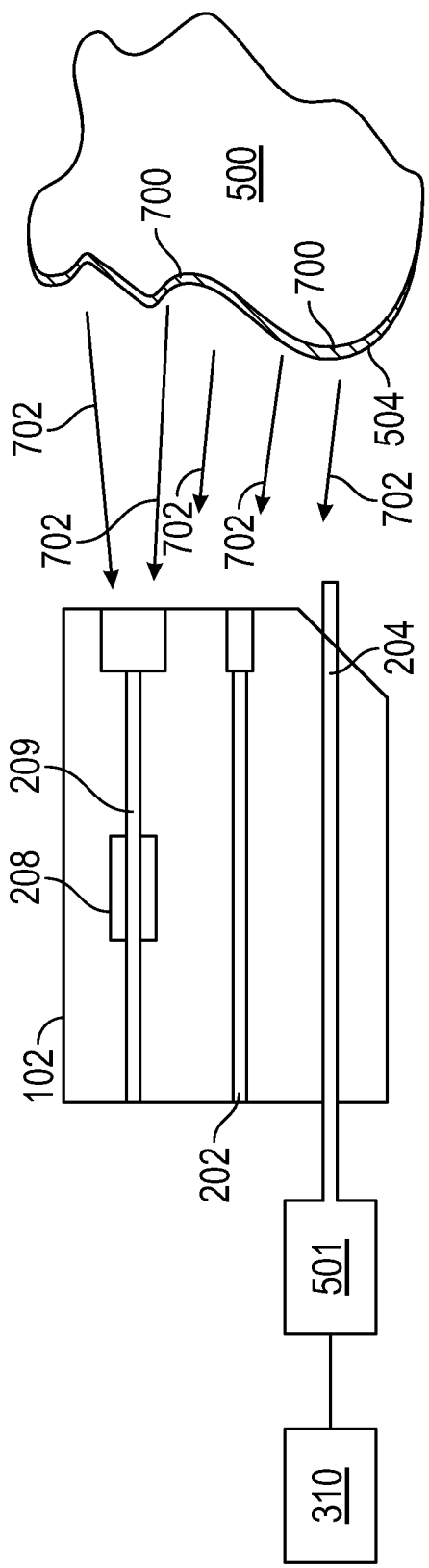
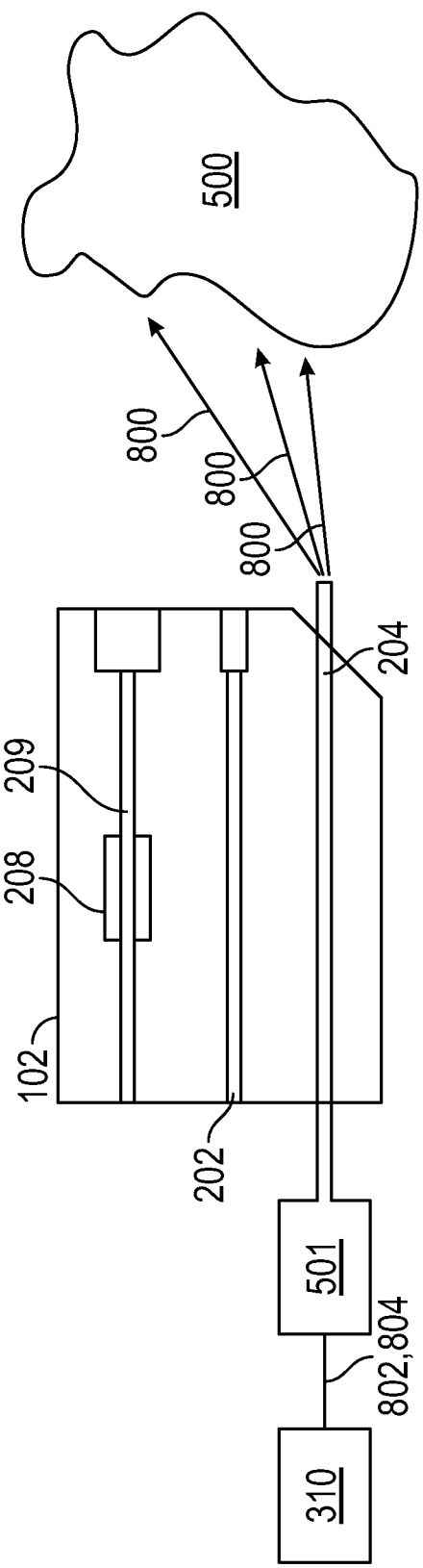
FIG. 7
FIG. 8

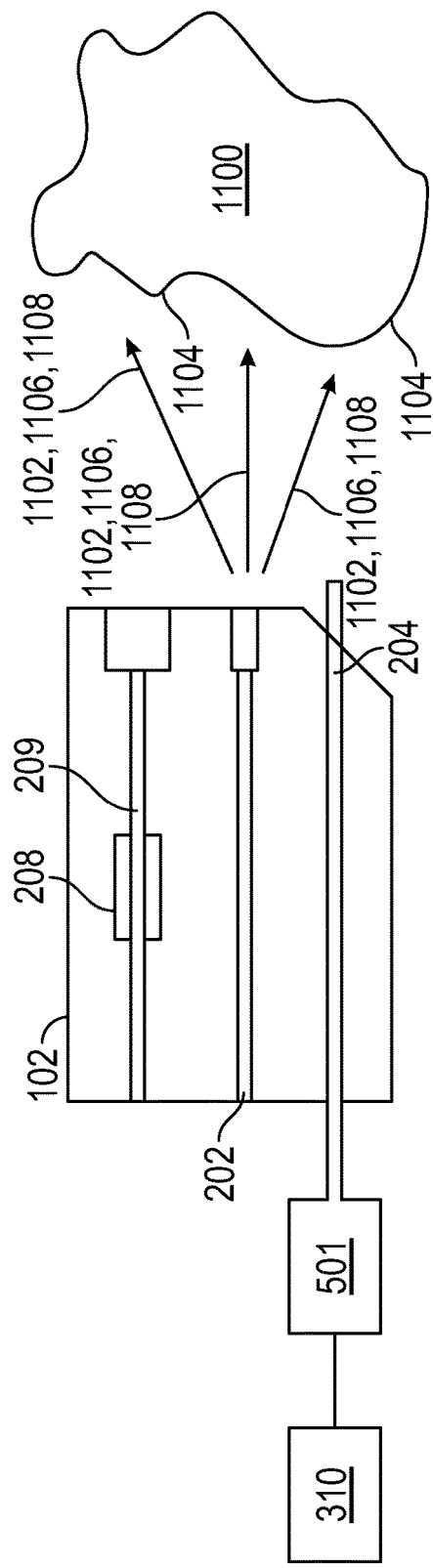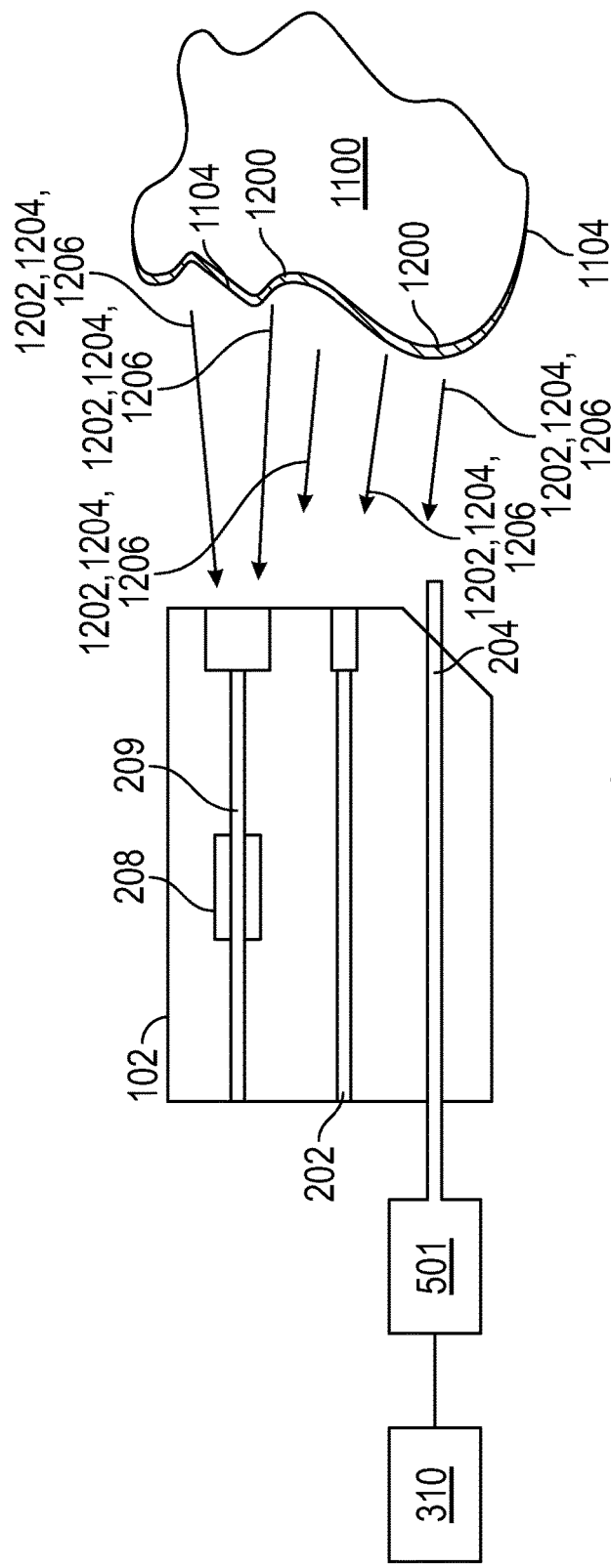

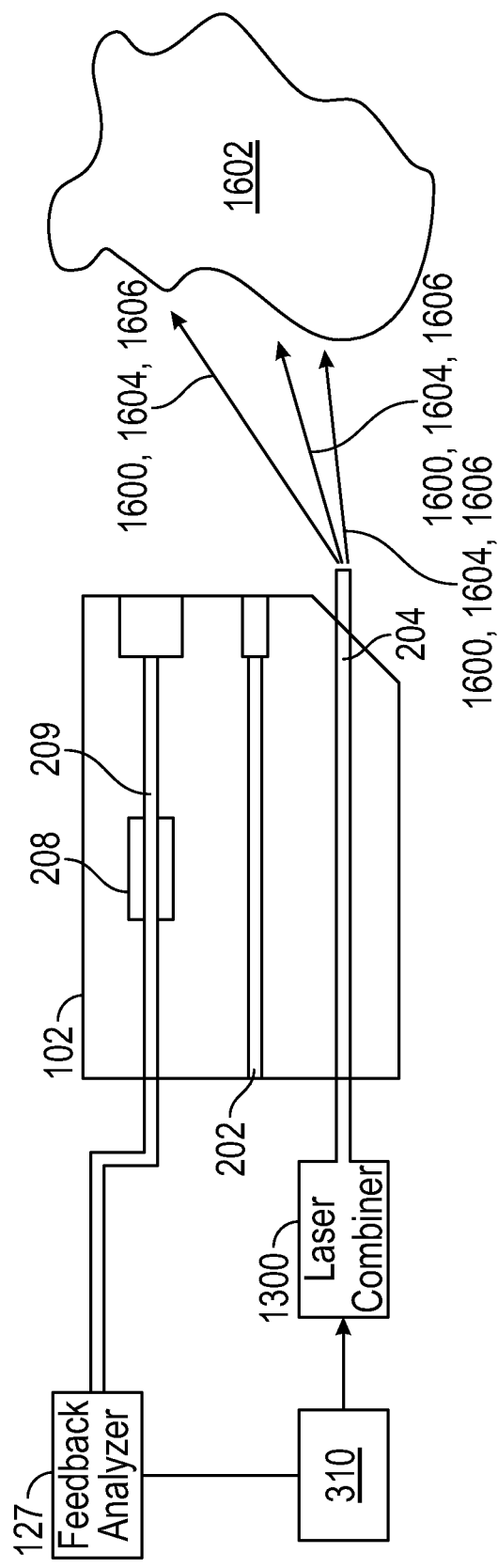
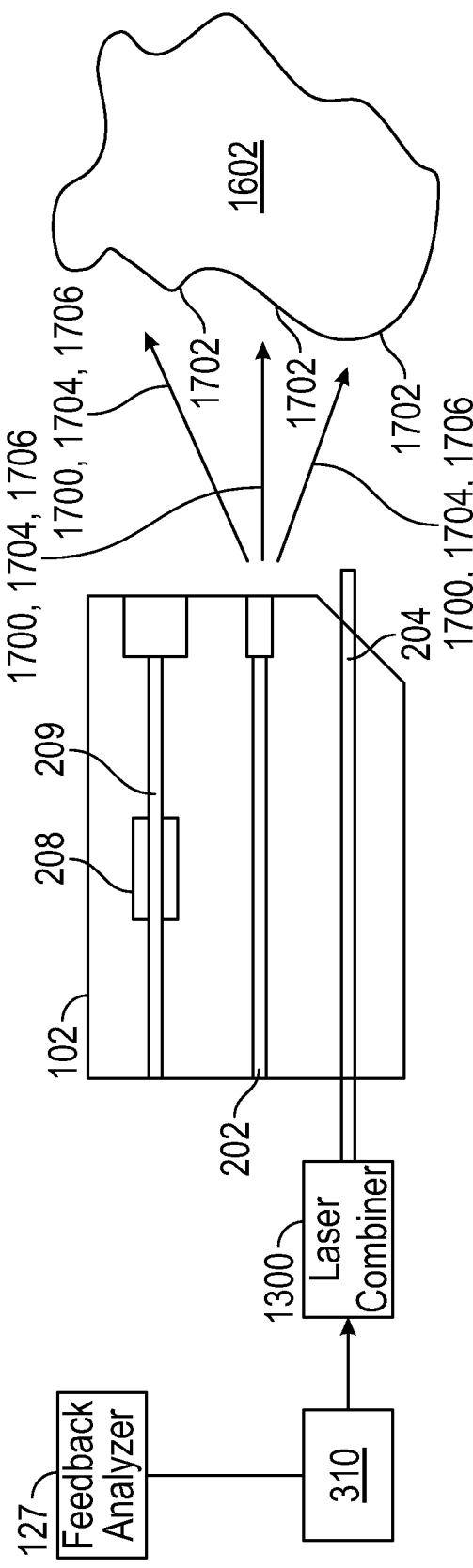

LASER COMBINATION WITH IN VIVO TARGET FEEDBACK ANALYSIS

PRIORITY CLAIM

This application claims the benefit of priority to U.S. Provisional Patent Application Ser. No. 63/270,730, filed Oct. 22, 2021, the contents of which are incorporated herein by reference in their entirety.

TECHNICAL FIELD

This document pertains generally, but not by way of limitation, to in vivo devices that can be used for various in vivo procedures. More specifically, but not by way of limitation, the present application relates to a device that can use light sources to ablate an in vivo target and can include adjusting the light sources during a procedure based on one or more characteristic(s) of the target.

BACKGROUND

Various in vivo procedures involve laser surgery. For example, laser surgery can be used to ablate kidney stones during a laser lithotripsy procedure, remove cancerous tissue, form incisions in tissue, and vaporize tissue, such as during the treatment of Benign Prostatic Hyperplasia (BPH). However, a number of issues can arise when a laser is used to perform a in vivo procedure.

For example, during a procedure to remove tissue at a in vivo target site, the composition of tissue at the in vivo target site can change as tissue is removed. For example, tissue can be highly vascularized. Thus, parameters for a laser being used during removal can be set to efficiently remove highly vascularized tissue. However, during the procedure, once the highly vascularized tissue is removed, a practitioner can encounter tissue that is less vascularized. Nevertheless, the parameters for the laser are set to remove highly vascularized tissue instead of tissue that is not highly vascularized. Therefore, efficiency of tissue removal is reduced, which can prolong the procedure to remove tissue from the in vivo target site.

Once the practitioner realizes that the composition of the tissue has changed, i.e., from highly vascularized to less vascularized, the practitioner has to adjust the parameters of the laser to increase the efficiency of removing the less vascularized tissue. Moreover, the process can repeat itself where, once the less vascularized tissue is removed, a practitioner can encounter tissue that is highly vascularized, thereby creating the same problem noted above.

Moreover, in some instances, a wavelength of light being emitted by a laser system during a tissue removal procedure can become highly absorbed. Here, carbonization of tissue at a in vivo target site can occur, such that the tissue can become obscured by smoke or can become opaque, such that the practitioner removing the tissue cannot accurately view the in vivo target site. Thus, the practitioner cannot tell if the laser energy is going too far (or not far enough) into the in vivo target site.

SUMMARY

Accordingly, what is needed is an approach that can (i) identify one or more characteristics of an in vivo target being ablated and removed, such as before or during the procedure in real time, and (ii) control an ablation device according to the one or more identified characteristic(s).

A system is described for performing a medical procedure (e.g., ablation of a target) at an in vivo target site. The system can include multiple laser modules having different wavelengths of light emissions. A controller can control activation and/or deactivation of individual ones of the laser modules, such as based on one or more characteristics of the target. For example, in response to laser illumination of the target site, fluorescence, reflection, absorption, scattering, or other response light signals from the target site in response to illumination of the target site can be used to determine a characteristic of the target site. A feedback analyzer can be used to determine a spectra of the emitted fluorescence, reflection, or other response signal. Based on the analysis, the system can determine one or more characteristics (such as the type, size, shape, depth, composition, composition profile, etc.) of the target. The determined characteristic(s) can be used to control one or more laser modules of the system. Although, for brevity, this document focuses on particular examples emphasizing a scenario in which the response signal is a fluorescence response signal, one or more other illumination response signals could similarly be additionally or alternatively used.

For example, one or more laser modules can be activated and/or deactivated in real time. As discussed herein, a laser module can include a laser source such that a laser source is being controlled. The feedback analyzer can determine a change in one or more characteristic(s) of the target occurred during the medical procedure, and the controller can selectively activate and/or deactivate one or more laser modules in real-time in response to the determined change in the target characteristic(s). To illustrate, the one or more laser modules can be controlled based on a depth of the target site. The depth can refer to a distance from a patient's body surface to a target site, how much material has been removed, or the like. Moreover, the target depth can refer to a type of tissue to be removed or a type of tissue to be analyzed. When the target site is at first depth, the one or more laser modules can be controlled to operate in a first configuration, such as using pre-stored control information corresponding to the first depth. To further illustrate, the system can include three laser modules and, in the first configuration, a first laser module can be activated while the other two laser modules are deactivated. When the target has been ablated to a second depth, different from the first depth, then, the system can switch to operate in a second configuration, using pre-stored control information corresponding to the second depth, to deactivate the first laser module and activate the second and third laser modules.

Each laser module of the plurality of laser modules can emit light at different wavelengths, which, in turn may have different penetration depths in the body and/or remove different types of target materials at different rates. Therefore, by selectively activating and/or deactivating the laser modules based on the one or more determined characteristic(s) of the target at the in vivo site, the treatment effect of the target at the in vivo site may be adjusted or optimized.

When multiple laser modules are selected, light emitted from the selectively activated laser modules can be directed to a laser light combiner that combines the light from an output of each activated laser module. This combined light output can be directed (e.g., via an optical passageway) to ablate at the in vivo target. Thus, the controller can control which one(s) of the laser modules should be activated to emit light based on the determined characteristic(s) of the tissue at the in vivo target site, which can be obtained before and/or during the medical procedure. At a first time, $t_1$, the controller can activate a first combination of laser modules to emit light based on a previously-acquired or real-time characteristic of the target at the in vivo target site. At a later second time, $t_2$, the controller can activate a different second combination of laser modules to emit light based on a change in the characteristic of target at the in vivo target site determined at the second time.

BRIEF DESCRIPTION OF FIGURES

FIG. 7 shows an example of emission and sensing of fluorescence response signals from a target site.

FIG. 8 is an example of removing tissue from a target site using a laser beam from a laser for which one or more parameters were established or adjusted, such as based on the method shown in FIG. 4.

FIG. 11 illustrates an example of illuminating a target site with pulsed light.

FIG. 12 shows an example of illumination and fluorescence response signal sensing from a target site.

FIG. 16 is an example showing the removal of tissue from a in vivo target site using a laser beam.

FIG. 17 illustrates the illumination of a in vivo target site with pulsed light.

DETAILED DESCRIPTION

This document describes a method of controlling a system for removing tissue, which can include a kidney stone, from a in vivo target site in real time. The system can include a feedback analyzer operatively coupled with a laser controller that controls a plurality of laser modules. The feedback analyzer can determine a composition of the tissue during tissue removal from the in vivo target site. Based on the composition of the tissue at the in vivo target site, the feedback analyzer can provide feedback to the laser controller, which can be used to control each laser module of the plurality of laser modules. As the composition of the tissue at the in vivo target site changes, the feedback analyzer can monitor and determine this composition change in real time, i.e., as the changes occur, and can provide this as feedback to the laser controller. The laser controller can control in real time each laser module of the plurality of laser modules based on the composition of the tissue at the in vivo target site.

Each laser module of the plurality of laser modules can emit light at different wavelengths. The different wavelengths can target different characteristics (e.g., such as type, size, shape, depth, composition, composition profile, etc.) of tissues for removal, such as at different rates. The plurality of laser modules can be operatively coupled with a laser light combiner that can combine the output from each laser module of the plurality of laser modules. The laser light combiner can provide the combined laser light output to a in vivo target site, such as via an optical passageway. The output from the combiner can be used to remove tissue from the in vivo target site. Thus, the laser controller can control which laser module, or laser modules, of the plurality of laser modules, should emit light based on the composition of the tissue at the in vivo target site. At a first time, $t_1$, the laser controller can control a first combination of laser modules to emit light based on, for example, the composition of tissue at the in vivo target site determined by the feedback analyzer at the first time. At a second time, $t_2$, the laser controller can control a second combination of laser modules different from the first combination of laser modules to emit light based on the composition of tissue at the in vivo target site determined by the feedback analyzer at the second time.

Figure 1:
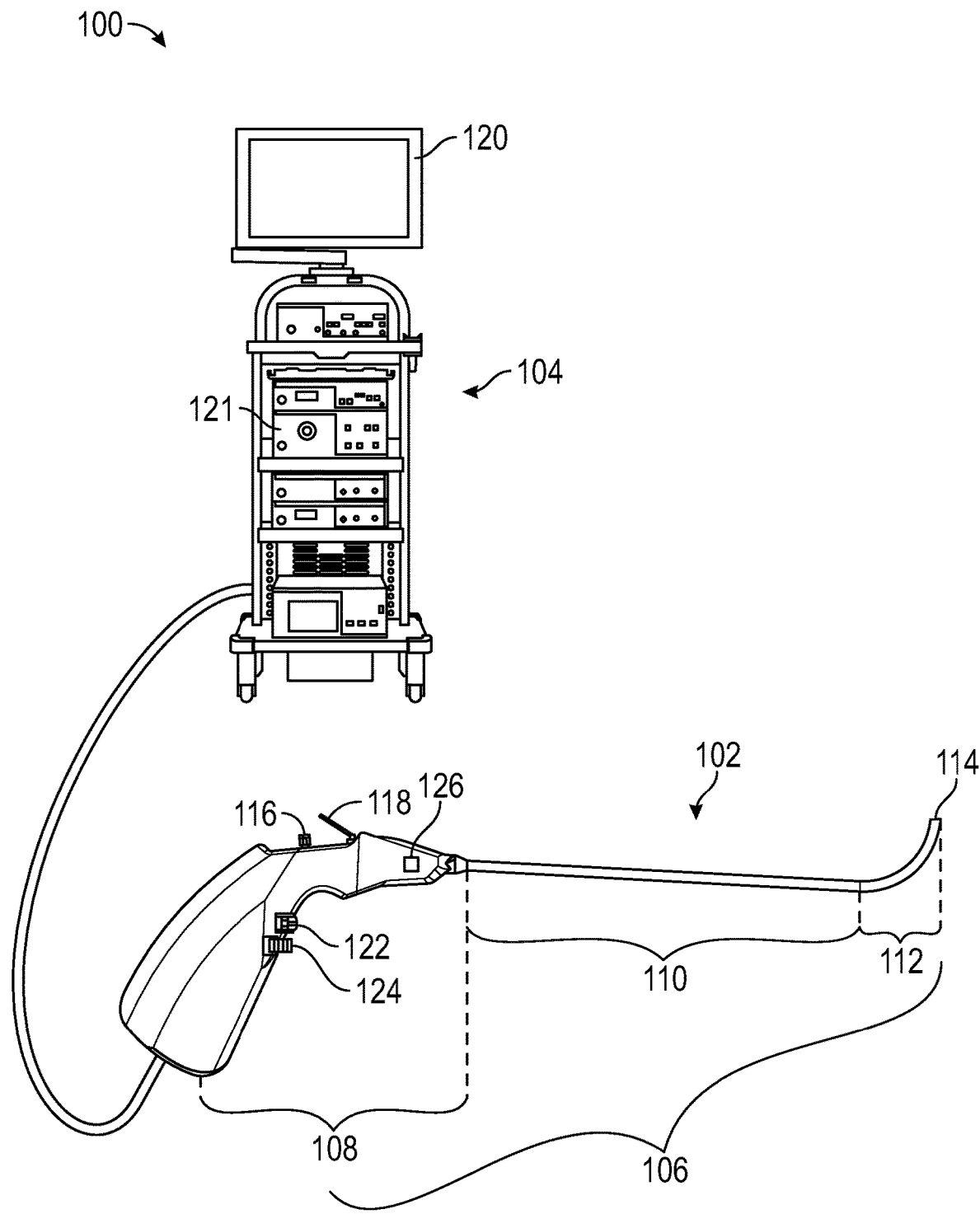
FIG. 1 illustrates an example of portions of a system that can include an endoscope for use in a procedure to remove material from a target site.

FIG. 1 shows an example of portions of a system 100 that can be used to treat or remove material from a target site, such as a in vivo site. The system 100 can include an endoscope 102, in communication with a platform 104 that can be used to provide an image of a target site to a practitioner, such as a medical professional. For example, the endoscope 102 can include a nephroscope, a cystoscope, a ureteroscope, or any other type of endoscope. The endoscope 102 can include a body 106 at least partially insertable into a patient. The body 106 can include a handle, a hub, or other grippable proximal portion 108, an elongate rigid portion 110 extending from the grippable proximal portion 108, and a flexible distal portion 112 extending distally from the elongate rigid portion 110 to a distal end 114. An articulation controller 116 can be located on the grippable proximal portion 108. The articulation controller 116 can be actuatable by a practitioner when the practitioner grips the grippable proximal portion 108. The articulation controller 116 can adjust the position of the flexible distal portion 112. The grippable proximal portion 108 can also have an electrical port 118 that can be coupled (e.g., via one or more wires extending along the body 106) to a substrate 200 (FIG. 2) that can be located at the distal end 114 of the body 106. While examples described herein include an endoscope, the present subject matter is not limited to an endoscope or devices implementing a spectroscopy techniques, but can include using other types of treatment devices.

The endoscope 102 can include a visualization system at the distal end 114 of the body 106 to allow a practitioner to visualize a target site. The visualization system can illuminate a working area of material, such as tissue or calculi (e.g., kidney or pancreobiliary or gallbladder stones) and can generate a video image or one or more static images of the illuminated area of the material. The visualization system can direct the video image to a display device 120.

Figure 2:
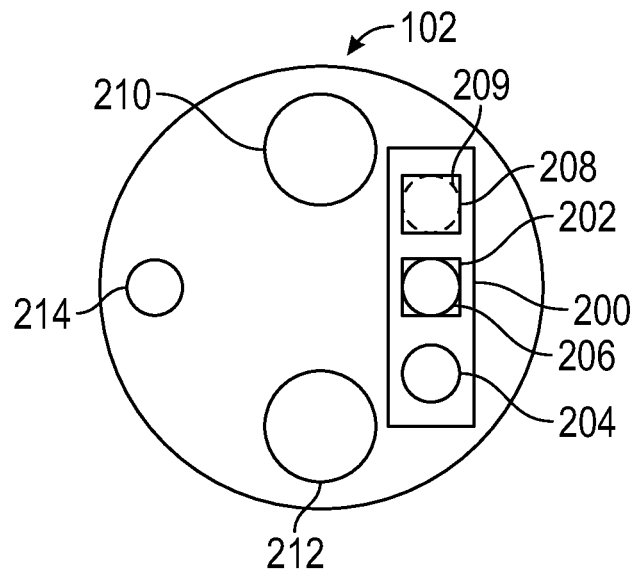
FIG. 2 illustrates an example of various features of the endoscope of FIG. 1.

The visualization system can include at least one light source 202 located on the substrate 200 at the distal end 114 of the endoscope 102 as shown in FIG. 2. Alternatively, the light source may be located at the proximal end of the endoscope 102 (or separate from the endoscope 102) and transmit light to the distal end of the endoscope via, for example, a optical fiber or an illumination channel. The substrate 200 can include one or more of a circuit board, a hybrid chip, a ceramic component, or other suitable components or elements. The electrical port 118 can receive electrical power to power the circuit board on the substrate 200. The circuit board or other substrate 200 can communicate digital video signals wirelessly to the display device 120. The circuit board or other substrate 200 can mechanically support and electrically power the light source 202. In addition to the circuit board or other substrate 200 and the light source 202 being located the distal end 114 of the endoscope 102, an imaging sensor 302 can also be located at the distal end 114 of the endoscope 102. For example, the imaging sensor 302 can include an imaging camera, such as a CCD or CMOS camera sensitive to ultraviolet (UV), visible (VIS) or infrared (IR) wavelengths.

The circuit board or other substrate 200, along with the light source 202, can alternatively be located at a proximal portion 126 of the endoscope 102, such as at the grippable proximal portion 108 of the endoscope 102. The substrate 202 can include the components and the functionality described herein when located at either the distal portion 114 or the proximal portion 126 of the endoscope 102.

The light source 202 can include a light-emitting diode (LED) and a xenon light, among others. The light source 202 can include a LED. The LED can output a white light that can include one or more of a blue wavelength, a green wavelength, a yellow wavelength, or a red wavelength. The light source 202 can include LEDs that can emit light at different wavelengths, such as to help obtain one or target characteristics at a target site, such as further described below. In some examples, the light source 202 can function as a user-visible aiming light for the endoscope 102, which a practitioner can visibly observe and use to determine where a laser of the endoscope 102 is pointing, while at the same time using the aiming light for illuminating a target site to detect one or more fluorescence or other response signals from the target site, such as described further herein.

The light source 202 can emit light directed distally away from the distal end 114 of the body 106, such as to illuminate material at the target site. As described above, the light source may be an external light source (e.g., outside of the endoscope 102) that provides light transmitted through the body 106 of the endoscope 102, such as through an optical fiber or fiber bundle, to illuminate the material at the target site. The light source 202 can emit white light to illuminate the calculi. White light can allow the practitioner to observe discolorations or other color-based effects on the material at the target site at or near the distal end 114 of the body 106. The light source 202 can additionally or alternatively emit blue light to illuminate the material at the target site. Blue light can be well-suited to show thermal spread and can thereby be used to detect actual or potential thermal damage in the material. Other color wavelengths or bands, such as red, amber, yellow, green, or others, can be used. The light source 202 can be coupled to an optical lens 206 that can refractively or otherwise angularly adjust the light output from the light source 202. The optical lens 206 can narrow the beam of light output from the light source 202. Moreover, the optical lens 206 can widen the beam of light output from the light source 202. Such an angular adjustment can help ensure that the material at the target site is sufficiently illuminated within a specified angular field of view.

An optical fiber 204 or fiber bundle can be integrated into the endoscope 102. The optical fiber 204 can extend along a fiber channel (which may be a working channel or a channel different from the working channel) in the body 106 of the endoscope 102. The optical fiber 204 can be separate from the endoscope 102. The optical fiber 204 can be fed along the fiber channel of the endoscope 102 before or during use and retrieved from the fiber channel of the endoscope 102 after use. The optical fiber 204 can be coupled to a material removal device 501 (FIG. 5), such as a laser emitter, external to the endoscope 102, such as via a suitable connector and can deliver a laser beam to material at a target site for material removal. The target site can include kidney stones for the laser beam to ablate into stone fragments. The target site can include tissue that the laser beam can ablate from the target site. The material removal device 501 is not limited to a laser beam. For example, a ultrasound transducer can be used to ablate soft tissue and/or hard tissue from a target site.

The laser beam generated by the laser emitter of the material removal device 501 can have a wavelength that corresponds to a spectral peak of absorption of human blood and saline, such as 2100 nm, 1942 nm, and others. For example, wavelengths in the range between 1900 nm and 3000 nm can correspond to a spectral region in which water is light-absorbing, while wavelengths between 400 nm and 520 nm can correspond to a spectral region in which oxy-hemoglobin and/or deoxy-hemoglobin is light-absorbing. For example, the material removal device 501 can include a thulium fiber laser that can produce a laser beam at a wavelength of 1908 nm or 1940 nm. The material removal device 501 can include a thulium:yttrium-aluminum-garnet (YAG) laser that can produce a laser beam at a wavelength of 2010 nm. The material removal device 501 can be a holmium:YAG laser that can produce a laser beam at a wavelength of 2120 nm. The material removal device 501 can include an erbium:YAG laser that can produce laser beam at a wavelength of 2940 nm. Other wavelengths in these ranges can also be used.

Moreover, the material removal device 501 can include a neodymium:(YAG) (Nd:YAG) laser that can produce a laser beam at a wavelength of 1064 nm. In general, delivering a laser beam that has significant light-absorption in blood and saline can be beneficial, because such laser beam can be less impactful on surrounding tissue. This can help reduce or eliminate damage to different material near the target site. The laser can provide light having an output power that falls within a suitable range of output power, such as between 20 watts and 120 watts, for example. The optical fiber 204 can include a multi-mode fiber or a single-mode fiber.

The visualization system can include an image capture device 208 that can be located on the circuit board or other substrate 200, which can mechanically support and electrically power the image capture device 208. The image capture device 208 can include an imaging sensor, such as a camera, and can capture a video image or one or more static images of the illuminated material at the target. The video image can be in real-time, or nearly real-time with a relatively short latency for processing, so that the practitioner can observe the material at the target site and the surrounding tissue as the practitioner manipulates the body 106 and controls of the endoscope 102. The image capture device 208 can include a lens and a multi-pixel photodetector sensor, such as a focal plane array (FPA) that can be located at a focal plane of the lens. The sensor can include a color sensor, such as an RGB sensor that provides intensity values for red light, green light, and blue light for each pixel in the video image. The circuit board can produce a digital video signal representing the captured video image of the illuminated material at the target site. The digital video signal can have a video refresh rate of 10 Hz, 20 Hz, 24 Hz, 25 Hz, 30 Hz, 40 Hz, 50 Hz, 60 Hz, or another suitable video refresh rate. In further examples, the image capture device 208 can be Spectroscopic Charge Coupled Device (CCD) or a complementary metal-oxide-semiconductor (CMOS) camera.

In further examples, the image capture device 208 can capture spectra emitted from a target site and provide the spectra to a feedback analyzer 121 of the platform 104 such as via an optical path 209. The optical path 209 can include a multi-mode optical fiber or a single-mode optical fiber or fiber bundle. As will be discussed further below, the feedback analyzer 121 can be configured to determine a spectra of a fluorescence or other response signal. Furthermore, as will be detailed further below, the feedback analyzer 121 can be configured to identify a characteristic of a target site using the identified spectra.

The endoscope 102 can also include an irrigation lumen 210 and a suction lumen 212 (each of which may be the same or different from the working channel). The irrigation lumen 210 can provide irrigant to a target site during a procedure. Furthermore, the suction lumen 212 can remove irrigant and waste from a target site. The endoscope 102 can optionally include a tube, chamber, additional working channel, or other passage 214 within the body 106 of the endoscope 102. A practitioner can use the passage 214 to deploy any type of separate tool or instrument, such as a lithotripter, a stone retrieval basket, or another suitable tool or instrument.

Returning to FIG. 1, the endoscope 102 can include a laser controller 122 such as can be located on the grippable proximal portion 108. Alternatively, the laser controller 122 may be separately located from the endoscope 102. The laser controller 122 can toggle a state of the laser beam between an operational state ("""on" state") and a non-operational state ("""off" state"). For example, the laser controller 122 can direct a wired and/or wireless laser control signal to a laser that is located external to the endoscope 102. The laser control signal can turn on or turn off the laser. In some implementations, a practitioner can use the laser controller 122 to adjust one or more settings of the laser, such as the output power, pulse width, pulse shape, and/or pulse frequency.

During a procedure, the practitioner can manipulate the laser controller 122 such that the laser can be operational for a period of time, such as one minute, two minutes, three minutes, four minutes, or any suitable length of time. During the period of time of laser operation, the practitioner can manipulate the body 106 of the endoscope 102 to move the delivered laser beam across a surface of the material at the target site. The laser power level and the exposure times can be such that the practitioner can safely switch the laser power on and off by hand, without a need for a mechanized or automated exposure mechanism. The laser power can also be low enough such that incidental exposure of surrounding tissue can avoid impacting the surrounding tissue. Furthermore, the endoscope 102 can include or couple to a flush controller 124, which can be used to control the flow of irrigant through the irrigation lumen 210 and suction through the suction lumen 212.

Figure 3:
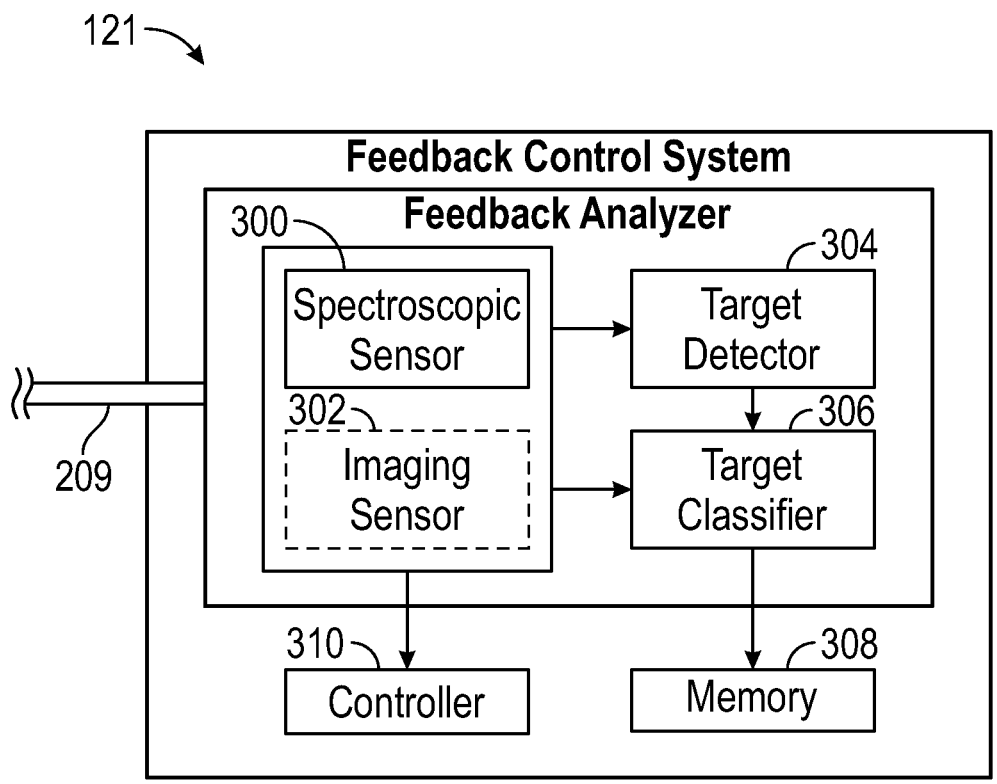
FIG. 3 illustrates an example of portions of a feedback analyzer of the system of FIG. 1.

FIG. 3 shows certain features of the feedback analyzer 121. The feedback analyzer 121 can include a light detector 300 configured to detect a light signal (e.g., fluorescence, reflection, or other response signal) from a target structure and analyze the received signal to determine a characteristic of the target. The signal processing and analysis can include analysis of, for example, a fluorescence, reflection, or other response signal intensity, a fluorescence excitation spectrum, a fluorescence emission, reflection, or other response signal spectrum, a fluorescence, reflection, or other response signal decay time, or other characteristic associated with the detected fluorescence, reflection, or other response signal. For example, the feedback analyzer 121 can generate one or more spectroscopic properties from the detected signal. The spectroscopic properties can include one or more fluorescence or other response signal characteristics and, additionally or alternatively, one or more other response signal characteristics such as reflectivity, reflectance spectrum, absorption index, or the like. The light detector 300 can include, among other things, a spectroscopic sensor such as a Fourier Transform Infrared (FTIR) spectrometer, a Raman spectrometer, a UV-VIS spectrometer, a UV-VIS-IR spectrometer, or a fluorescence spectrometer, among others. Furthermore, light sensors, such as those based on CMOS, CCD technology for converting photons to electrical signals using photodiodes are suitable. Light detectors can be individual photodiodes, or an array of photodiodes such as those used in CMOS or CCD imagers for digital cameras. Both kinds of these devices provide an electrical signal that corresponds to the intensity of an optical signal at particular wavelengths and are suitable for conducting spectroscopy. Additionally, any type of spectrometer or spectrophotometers that can collect light intensity versus wavelength can be used. The light detector 300 can correspond to a spectroscopy modality or technique. For example, UV-VIS spectroscopy can be used to gather information from fluorescence light or reflection light or other response light from a target object or site, such as can be similar to the information yielded from the eye or a color image made by a high resolution camera, but more quantitatively and objectively. For example, the spectroscopy can provide information about the material based on reflected light from the target since light reflection and absorption can depend on its chemical composition and surface properties. Information about both surface and bulk properties of the sample can be obtained using this technique. The reflection spectroscopy can be used to recognize a composition of hard or soft tissue. FTIR spectroscopy can be used for rapid materials analysis and has relatively good spatial resolution and can give information about the chemical composition of the material. Raman spectroscopy can be used for identifying hard and soft tissue components. As a high spatial resolution technique, Raman spectroscopy is also useful for determining spatial distribution of components of a material within a target object.

The light detector 300 can also be used with fluorescence spectroscopy. Fluorescence spectroscopy is a type of electromagnetic spectroscopy that analyzes fluorescence from a sample. Fluorescence spectroscopy can involve using a beam of illumination light, such as ultraviolet, that excites a material component at the target site and causes the material component to emit fluorescence response light, typically in visible or IR area. Fluorescence spectroscopy can be applied for analysis of some organic components, such as to help distinguish between hard and soft tissue. The light detector 300 can include more than a single type of spectrometer or imaging camera, such as to permit a broader capability of sensing and detecting various features (e.g., carbonized and non-carbonized tissue, vasculature, or the like). Moreover, the imaging sensor can use one or more imaging capabilities of the endoscope 102 that are available for use during a therapeutic or diagnostic procedure. For instance, the endoscope 102 can be used for visualizing an anatomical feature during a therapeutic procedure (e.g., laser ablation of a tumor or a kidney stone). In such cases, the endoscopic imaging capabilities of the endoscope 102 can be used or augmented by the light detector 300. For example, the endoscope 102 can provide narrow band imaging suitable for enhanced visualization of one or more anatomical features (e.g., lesions, tumors, vasculature, stone, or the like). Combining the light detector 300 with the endoscopic imaging (white light and/or narrow band imaging) can help in detecting one or more tissue properties, such as a level of carbonization, which information can be used to precisely control the delivery of therapeutic treatment. For example, the light detector 300 can be operatively coupled to an optical path 209. Thus, optical signals, such as fluorescence or other response signals received at the optical path 209, can be provided to the light detector 300.

The feedback analyzer 121 can include the imaging sensor 121 along with one or more of a target detector 304 or a target classifier 306. The target detector 304 can be configured to identify a target structure as one of a plurality of structure categories, such as can include using one or more fluorescence properties of the detected fluorescence or other response signal and/or one or more spectroscopic properties such as those generated by the light detector 300 as described above. Moreover, the target detector 304 can be configured to identify a target structure as one of a plurality of structure categories in combination with the imaging properties detected by the imaging sensor 302. For example, the target detector 304 can identify a target characteristic, such as to help characterize a target structure as a category of calculus structure or as a category of anatomical structure using one or more fluorescence and/or other response signal spectroscopic properties. Examples of a calculus structure can include stones or stone fragments in various stone-forming regions such as a urinary system, the gallbladder, nasal passages, the gastrointestinal tract, the stomach, or the tonsils. Examples of the anatomical structure can include soft tissue (e.g., muscles, tendons, ligaments, blood vessels, fascia, skin, fat, and fibrous tissues), hard tissue such as bone, connective tissue such as cartilage, among others.

The feedback analyzer 121 can generate a response signal spectrum, such as a reflectance spectrum using a received reflected signal and can extract one or more spectral features from the reflectance spectrum. The response signal spectrum can include reflectance intensities over a plurality of wavelengths. Reflectance can be determined as a fraction of incident electromagnetic power reflected at a material interface. Reflectance can represent the effectiveness of the material surface in reflecting electromagnetic radiation. In addition to reflectance, the response signal spectrum can also represent illumination energy absorbed at a in vivo site, and re-emitted at a fluorescence response signal wavelength, including for a short time after the in vivo site is no longer being illuminated by a light source. The reflectance spectrum can be formatted as a data array or a graphical representation such as a spectral reflectance curve. For example, the reflectance spectrum can represent reflectance over wavelengths in a range of approximately 400-1000 nm.

The articulation controller 116, the laser controller 122, the flush controller 124, the feedback analyzer 121 and/or the target detector 304 described herein may be implemented in a single controller or in separate controllers. In addition, two or more of these may be implemented in a single controller while the others are implemented in separate controllers. The controller(s) used herein may be implemented in hardware, software, or a combination of the two. The software may be written in any of a number of high-level languages such as FORTRAN, PASCAL, JAVA, C, C++, C#, BASIC, various scripting languages, and/or HTML. Additionally, the software can be implemented in an assembly language directed to the microprocessor resident on a target computer. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. The hardware circuitry may be implemented using, for example, one or more FPGA, CPLD or A SIC processors.

Figure 4:
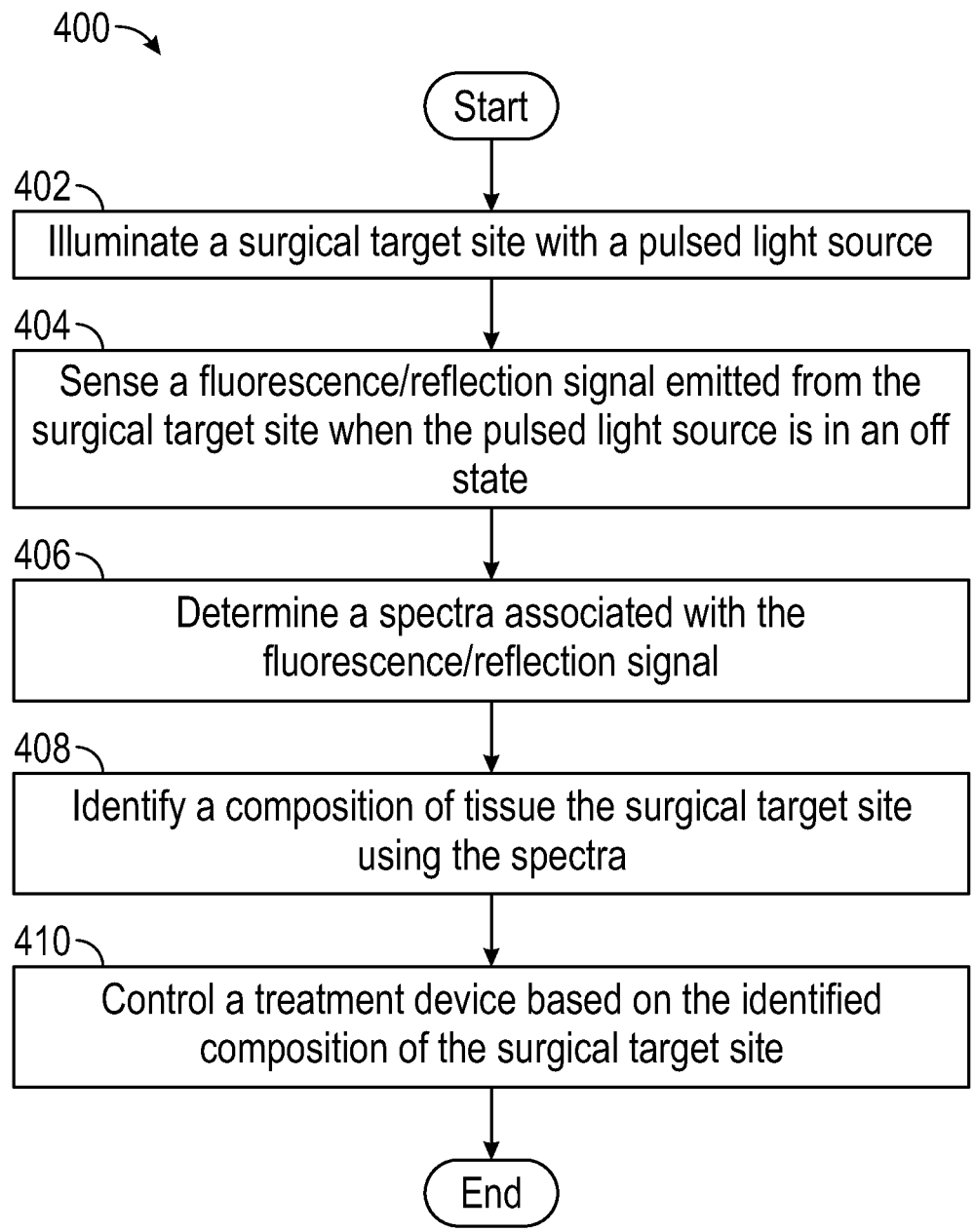
FIG. 4 shows an example of portions of a method of determining a characteristic of a target site.

FIG. 4 shows an example of portions of a method 400 of determining a material characteristic at a target site. At 402, a target site can be illuminated with a light source. The light source can be periodically or randomly activated and deactivated, such as to generate pulsed illumination. For example, at 402, the light source can be activated to illuminate a target (i.e., the light source is in an "on" state). To further illustrate examples associated with the method 400 and referred to herein as the "first illustration," now making reference to FIG. 5, at 402, the endoscope 102 can be controlled to illuminate a in vivo target site 500 with pulsed light 502. The light source 202 can provide white light or other broadband light from an LED to the in vivo target site 500 at 402. In the first illustration, broadband or white light can be used. White light can include all wavelengths of light in the visible spectrum at equal intensities. Thus, the white light can include the wavelengths that can excite fluorophores at the in vivo target site 500. In the first illustration, a surface 504 of the in vivo target site 500 is illuminated with the pulsed light 502. More specifically, the in vivo target site surface 504 absorbs energy, such as photons, which causes excitation, such as the excitation of fluorophores at or below the in vivo target site surface 504.

In FIG. 4 at 403, the light source 202 can be switched from an "on" state in which the LED emits light to an "off" state where the LED does not emit light. During such time (i.e., when the pulsed light source is in the "off" state), at 404, a fluorescence response signal emitted from the target site is detected by the light detector 300 of the feedback analyzer 121 in response to the illumination. Alternatively, at 404, a reflection response signal from the target site can be detected by the light detector 300. In either example, since the pulsed light source is in the "off" state, fluorescence signals or reflection signals or other response signals from the target need not be obscured or saturated by the wavelengths of illumination energy that energizes the target site. This can help permit more accurate determination of the target characteristic of the target site based on the detected fluorescence, reflection, or other response signal(s).

Figure 6:
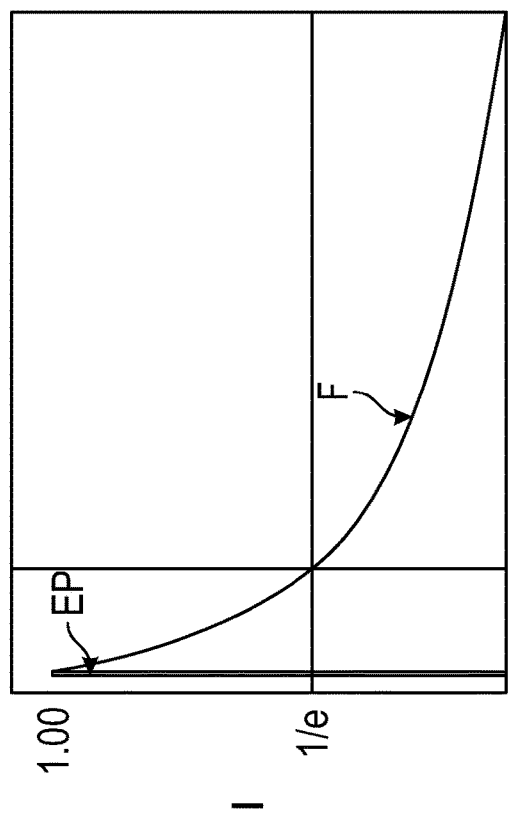
FIG. 6 illustrates an example of fluorescence response emissions of fluorophores that are excited by illumination light.

The material at a target site can include fluorophores that can be excited by specific wavelengths in the light emitted from a light source. When fluorophores are excited, they can emit light for a short duration of time, as shown with reference to FIG. 6. In particular, when an excitation pulse EP, such as pulsed broadband or white light, is directed toward material including fluorophores, the energy absorbed by the material including fluorophores decays over a time T where the decay time is proportional to an intensity I associated with the light used to illuminate the material having the fluorophores, as shown with fluorescence F. The fluorescence F can be used to determine a fluorescence intensity and a fluorescence excitation spectra. Furthermore, the fluorescence F can be used to determine a fluorescence emission spectra and a fluorescence decay time. A CCD or CMOS or other photosensor can be used to detect the fluorescence F before the intensity associated with the fluorescence F decays to a point below which a CCD or CMOS or other photosensor cannot detect the fluorescence F. At 404, the energy absorbed can be detected as a fluorescence response signal.

At 403, the light source 202 can be switched from the "on" state in operation 402 to an "off" state. When the light source 202 is switched to the "off" state, the method 400 can perform the operation 404 in the first illustration. In particular, at 404, energy absorbed by the in vivo target site surface 504, generically shown as energy 700 in FIG. 7, can be emitted as fluorescence response signals 702, which can correspond to a wavelength emitted from the in vivo target site surface 504. Thus, when the in vivo target site surface 504 is energized, the fluorescence signals 702 can correspond to a wavelength emitted from the energized in vivo target site surface 504. In the first illustration, the fluorescence signals 702 can be transmitted to the feedback analyzer 121 via the optical path 209, optical fiber 204, and/or passage 214 such that the feedback analyzer 121 can analyze the detected fluorescence or other response signals 702.

Once the fluorescence signals are detected at 404, the method 400 optionally performs an operation 406, where a fluorescence property (e.g., a fluorescence intensity, a fluorescence excitation spectrum, a fluorescence emission spectrum and/or a fluorescence decay time) and/or a spectra associated with the fluorescence signal is determined. The feedback analyzer 121 can be used to determine the spectra associated with the fluorescence signal as discussed above. Additionally or alternatively, spectra can be extracted from a reflection signal or a normalized reflection signal of a particular calculus structure of a target site at 406. Such reflectance features can include a reflectance spectrum (or normalized reflectance spectrum) at a specific wavelength or over a wavelength range, a statistical value calculated from the reflectance spectrum (e.g., a variation of reflectance over two or more different wavelengths, a rate of change of reflectance over a range of wavelengths, or the like), or a graphical feature representing the morphology of at least a portion of the spectral reflectance curve (e.g., a slope, a curvature, a segment of the curve, or the like). The calculi reflectance features and the tissue reflectance features can be stored in memory circuitry of the platform 104.

After determining a spectra associated with the fluorescence, reflection, or other response signal at 406, then at 408 a characteristic of the target site can be determined using the fluorescence or other response property and/or spectra. For example, at 408, to determine a characteristic of the target site, the target detector 304 can additionally or alternatively extract one or more target reflectance features from the reflectance spectrum determined at 406. The target detector 304 can identify the target as a calculus structure if the target fluorescence property and/or reflectance property or other response feature exceeds a feature threshold or falls within a value range by comparing the fluorescence property and/or reflectance feature or other response feature with the predetermined threshold or the value range based on the characteristic. Additionally, the target detector 304 can identify the target as kidney tissue if the target fluorescence property and/or reflectance feature falls below the predetermined threshold or falls outside the value range based on the characteristic. The predetermined threshold or value range can be determined using the calculi fluorescence properties and/or reflectance features and the tissue fluorescence properties and/or reflectance features obtained in vitro and/or in vivo before the procedure. Moreover, the threshold or the value range associated with an individual characteristic of the target can be stored in a lookup table at the platform 104. In an example, the threshold can be determined as one that separates the calculi fluorescence properties and/or reflectance features and the tissue fluorescence properties and/or reflectance features with a specified margin.

At 408, the target detector 304 can trend the fluorescence properties and/or reflectance intensities of material at a target site over a range of wavelengths and determine the material based on the trend of the fluorescence properties and/or reflectance intensities (or the "fluorescence trend" or "reflectance trend"). For example, the fluorescence trend and/or reflectance trend can be generated within a first range of 400-550 nm. The material can be determined be a calculus structure if a monotonic increase fluorescence trend and/or reflectance trend is present in a first wavelength range. The material can be identified as kidney tissue if no monotonic increase of the fluorescence trend and/or reflectance trend is present in the first wavelength range. In another example, the fluorescence trend and/or reflectance trend can be generated within a second range of 650-700 nm. The material can be determined to be a calculus structure if a monotonic increase of the fluorescence trend and/or reflectance trend is present in the second wavelength range. The material can be determined to be kidney tissue if a monotonic decrease of the fluorescence trend and/or reflectance trend is present in the second wavelength range.

A template matching approach can be used by the target detector 304 to determine the material at the in vivo site to be a calculus structure or an anatomical structure. The target fluorescence property and/or reflectance feature can be compared to at least one of the calculi fluorescence properties and/or reflectance features or at least one of the material fluorescence properties and/or reflectance features stored in memory 308 of the feedback analyzer 121 to determine if a matching criterion is satisfied. For example, the material at the in vivo site can be determined to be a calculus structure if a dissimilarity metric between the target fluorescence property and/or reflectance feature and the calculi fluorescence property and/or reflectance feature is below a first similarity threshold or identified as kidney tissue if a dissimilarity metric between the target fluorescence property and/or reflectance feature and the tissue fluorescence property and/or reflectance feature is below a second similarity threshold.

The target classifier 306 can use intra-category difference in reflectance spectra among different structure types of the same category as described above to classify the material at the target site as one of a plurality of structure types of the same category, such as a particular tissue type within an identified category of anatomical structure, or as a particular calculus type within an identified category of calculus structure. The classification can be based on one or more of reflectance at a specific wavelength, a statistical feature (e.g., variance or other variation metric) of reflectance over two or more different wavelengths, or a graphical feature generated from a graphical representation of the reflectance spectrum. For example, in instances in which the target site includes stones, based on the distinct normalized reflectance spectra among various stone types, the target classifier 306 can compare a normalized reflectance at a specific wavelength (e.g., 550 nm) or wavelength range to one or more thresholds to classify the stones at the in vivo site as a particular stone type.

One or more spectroscopic properties can be used by the target classifier 306 to classify a determined anatomical structure as one of plurality of tissue types. For example, the target classifier 306 can be configured to classify determined renal tissue as one of tissue types with distinct anatomical locations, such as calyx tissue, cortex tissue, medulla tissue, or ureter tissue. For example, based on the distinct normalized fluorescence and/or reflectance spectra among various tissue types, the target classifier 306 can classify the tissue at the in vivo site as a particular tissue type based on a comparison between the normalized fluorescence and/or reflectance at a specific wavelength (e.g., 480 nm) or wavelength range and one or more fluorescence and/or reflectance thresholds.

The target classifier 306 be configured to classify a determined anatomical structure as normal tissue or abnormal tissue (e.g., cancerous tissue). Normal and cancerous tissue can demonstrate distinct fluorescence and/or reflectance spectra with different shapes and peak locations (i.e., the wavelength at which the fluorescence and/or reflectance spectrum reaches a peak value across a wavelength range). The classifier 306 can be configured to classify or determine anatomical structure as a treatment area (e.g., tumor or polyp intended for removal) or a non-treatment area (e.g., blood vessels, muscle, etc.). The classification can be based on one or more of fluorescent and/or reflectance at a specific wavelength, a statistical feature (e.g., variance or other variation metric) of fluorescent and/or reflectance over two or more different wavelengths, or a graphical feature (e.g., a slope) generated from a graphical representation of the fluorescence and/or reflectance spectrum. Cancerous tissue can have different spectra in comparison to non-cancerous tissue. Thus, the target classifier 306 can classify the tissue based on the fluorescence, reflectance, or other illumination response spectra.

The feedback analyzer 121 can also include a controller 310. The controller 310 can automatically control the laser 510 or other material removal device 501. This can obviate the need for a practitioner to manually control the material removal device 501.

Returning to the first illustration, at 406, the fluorescence signals 702 detected at 404 are transmitted to the feedback analyzer 121, which determines that a spectra of the target has a specific spectra (e.g., 460 nm to 700 nm) when illuminated with the light source (e.g., having a wavelength in a range of 450 nm to 500 nm). Moreover, at 408, the feedback analyzer 121 identifies the target characteristic at the in vivo site (e.g., the type, material, composition, composition profile, structure, hardness, etc.) based on the detected fluorescence signals (e.g., the shapes and peak locations of the spectra).

At 410, a treatment device, can be optionally controlled based on the material characteristic identification at 408. For example, a control signal can be used to adjust various parameter settings of the apparatus, such as an energy emission from the apparatus. For example, where the apparatus includes a laser system, the parameter settings can include an energy of a laser pulse, pulse frequency, laser power, and a pulse mode, a pulse width of a laser pulse, a pulse shape of a laser pulse, a peak power of a laser pulse, or a pulse frequency representing a number of laser pulses per unit time, etc. Here, the emission can relate to a laser associated with these parameters. Furthermore, 410 can be performed in real-time, such that one or more control signals can be sent by the controller 310 to the apparatus to adjust the apparatus during a in vivo procedure that removes tissue or any other type of detritus from a target site.

For example, if the material at the target site is determined to include cancerous tissue (or, in some embodiments, a kidney stone) and the apparatus is a laser device, the controller 310 can control the laser to deliver a laser beam that can remove the cancerous tissue (or, in some embodiments, fragment the kidney stone). Thus, the controller 310 can control a treatment device based at least in part on a determined first characteristic. Returning to the first illustration, here, the material removal device 501 can include a Nd:YAG laser. Additionally, as noted above, the feedback analyzer 121 identified the tissue at the in vivo site as being cancerous based on shapes and peak locations of the spectra. Thus, at 410 in the first illustration, the controller 310 can automatically control the material removal device 501 to emit a laser beam at a wavelength of, for example, 1064 nm to remove the cancerous tissue at the in vivo target site 500 such that the material removal device 501 is controlled based at least in part on a first identified target characteristic. As shown in FIG. 8, the automatic controller 310 can send signals 802 to the material removal device 501 to target laser beams 800 at the in vivo site 500 via the optical fiber 204. Upon completion of 410, the method 400 is complete; alternatively, operations 402-410 may iteratively performed until a particular treatment effect is achieved (e.g., when a kidney stone is completed fragmentated or dusted).

Figure 9:
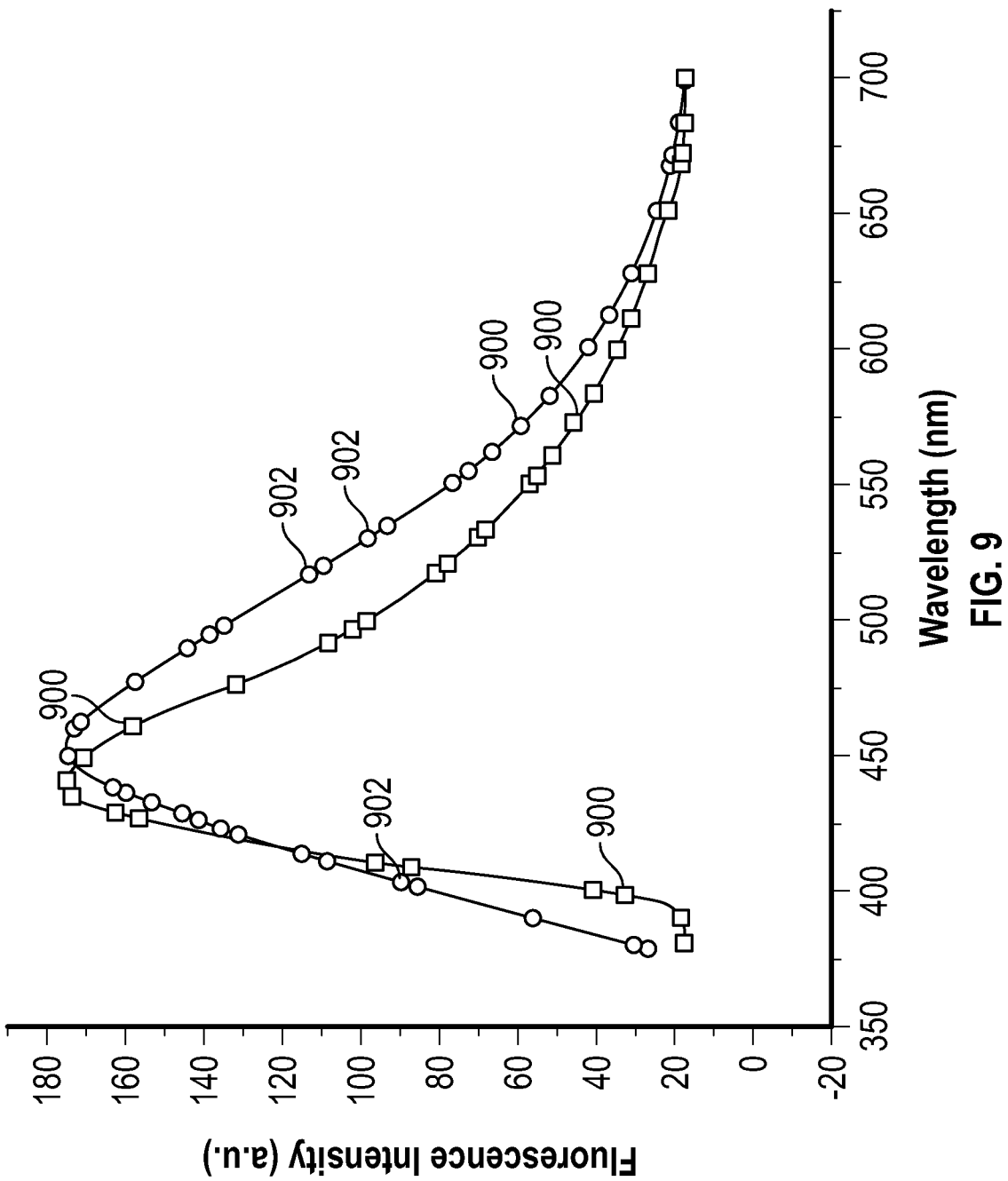
FIG. 9 illustrates an example of a difference of fluorescence response intensity as a function of wavelength for tumoral tissue and healthy tissue.

When the light source 202 is switching between an "on" state and an "off" state, a different excitation wavelength can be emitted during the time in which the light source is an "off" state. For example, either the light source 202 or the material removal device 501 can be capable of emitting the different excitation wavelength. To further illustrate, the different excitation can have a 370 nm wavelength and can produce a fluorescence between about 425 nm and 550 nm, as shown in FIG. 9. In FIG. 9, when tumoral tissue exists, the spectra will reflect this, as shown at 900. Moreover, the spectra can also reflect the presence of healthy tissue, as shown at 902.

The method 400 can be performed during a first time period where a first spectra associated with a fluorescence signal is determined and a characteristic of material at the in vivo target site 500 is determined during a first time period and the material removal device 501 and a first control signal, such as the control signal 802, is sent to the material removal device 501 from the controller 310. Here, the material removal device 501 can be controlled in real time based on the determination made during the first time period. During a second time period, the method 400 can be repeated where a second spectra associated with a fluorescence signal is determined and a second characteristic of material at the in vivo target site 500 is determined during the second time period and the material removal device 501 is controlled in real time based on the determination made during the second time period. In particular, the controller 310 can send a signal 804 (FIG. 8) based on the determination made during the second time period where a second characteristic of the target can be determined during the second time period using the principles discussed herein. Moreover, the second characteristic can be different from the first characteristic or the same as the first characteristic. For example, the characteristic can be determined to be different from what was determined in the first time period. Here, the laser can be controlled based on the identification of the characteristic during the second time period. Also, the second control signal 804 and the second adjustment after the second time period based on the second control signal 804 can be made in real time.

The apparatus can be controlled by making a second adjustment to a laser. The second adjustment can include adjusting one or more parameters of the laser such as an energy of the laser pulse, pulse frequency, laser power, and a pulse mode. Moreover, in some examples, a parameter adjusted after the first time and a parameter adjusted after the second time can be different. For example, after the first time period, an energy of the laser pulse can be adjusted while the after the second time period, a pulse frequency can be adjusted.

A characteristic of a in vivo target site can be determined by detecting fluorescence when a broadband or white light source is in an "off" state after illuminating the in vivo target site in "on" state. Multiple light sources (e.g., light emitting diodes or LEDs) can be pulsed to illuminate a in vivo target site and a fluorescence response signal can be measured after each light source is pulsed. For example, each light source (e.g., LED) of the multiple light sources can sequentially emit a different color with a sufficiently high rate such that a combination of the different colors can be perceived by the human eyes as white light. For three light sources, where a first light source emits red light, a second light source emits green light, and a third light source emits blue light, the combination of the red, green, and blue light sources create white light. Moreover, while the colors red, green, and blue are discussed herein to create white light, any light colors can be used to determine a characteristic of a in vivo target site. A spectra and a characteristic of the target at a in vivo target site can be determined based on the fluorescence emitted in response to all the light sources illuminating the in vivo target site such as further described in FIG. 10.

Figure 10:
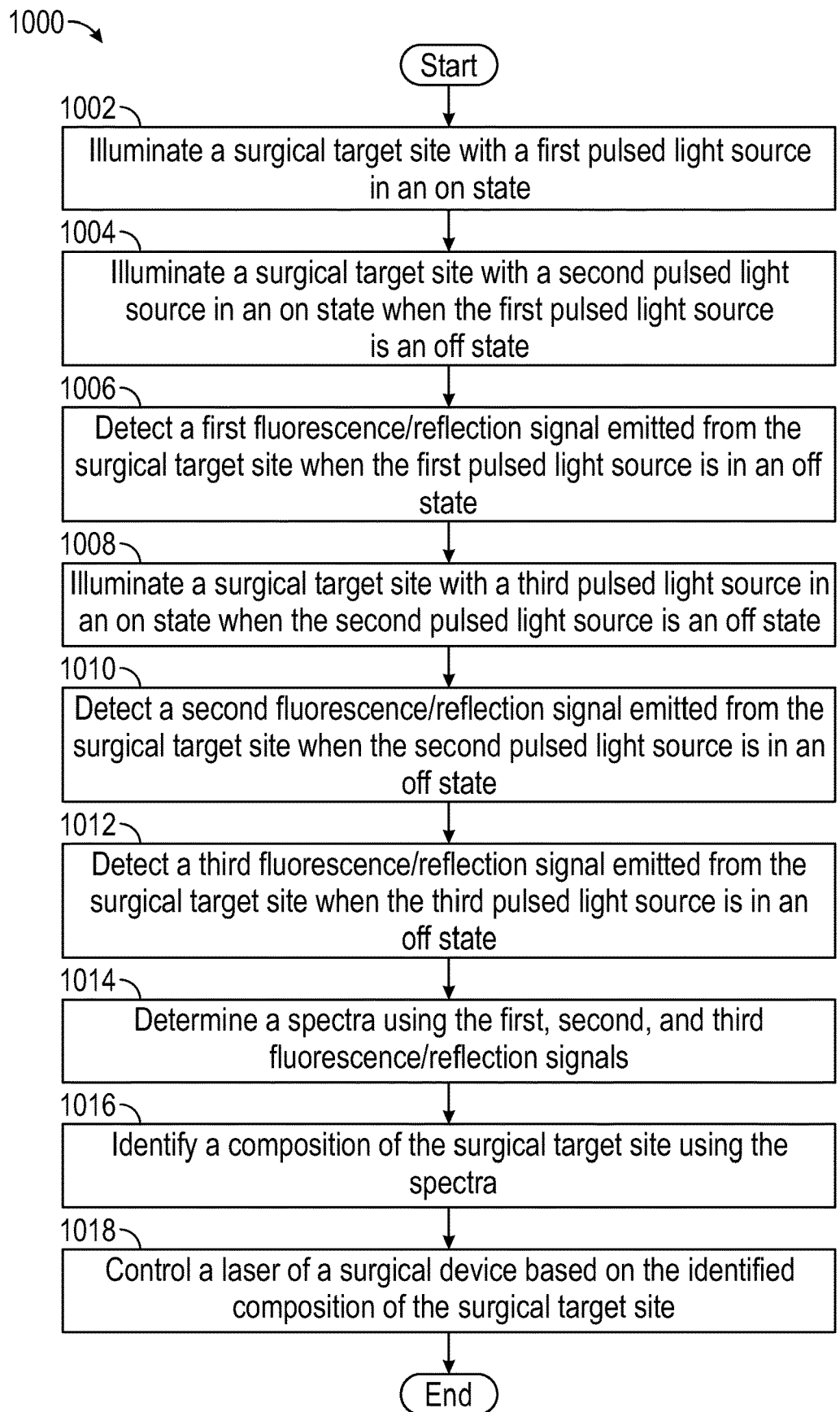
FIG. 10 shows an example of determining a characteristic of a target site.

FIG. 10 shows an example of a method 1000 of identifying a characteristic of a in vivo target site using multiple LEDs, each emitting light at a different wavelength. The LEDs can be sequentially switched on and off at a sufficiently high rate such that the combination of the different colors is perceived by the human eyes as white light. Fluorescence signal(s) in response to the previously activated LED can be detected while the current LED (emitting a different wavelength of light) is illuminating the target site. For example, the light source may include a red, a green, and a blue LED. The light source can sequentially emit red, green, blue, red, green, blue . . . light with a sufficiently high frequency during the laser procedure. While the green or blue LED is currently emitting the light, the fluorescence signal(s) in response to the previously emitted red light can be detected and analyzed. At 1002, the target site can be illuminated with a first pulsed light source in an "on" state of the first pulsed light source. For example, the first light source can correspond to a first color, such as the color red. With reference to FIG. 11, at 1002 the endoscope 102 can be controlled to illuminate a in vivo target site 1100 with first pulsed, first color light 1102. In the second illustration, at 1002, the light source 202 can provide red light from an LED to the in vivo target site 1100 where the red light can correspond to the first pulsed light 1102. In the second illustration, the endoscope 102 can illuminate the in vivo target site 1100 by having the light source emit the red light during an "on" state such that a surface 1104 of the in vivo target site 1100 is illuminated with the first pulsed, first color light 1102. For example, the in vivo target site surface 1104 can absorb photons, which, in turn, can cause excitation of fluorophores, at the in vivo target site surface 1104.

At 1004, the target site can be illuminated with a second pulsed, second color light source in an "on" state of the second pulsed light source. For example, the second light source can correspond to a second color, such as the color green. At 1004, the first pulsed light source that illuminated the in vivo target site at 1002 is in an "off" state.

During, before, or after 1004, at 1006 a first fluorescence signal can be emitted from the in vivo target site and detected when the first pulsed light source site is in an "off" state. The target site can include fluorophores that can be excited by specific wavelengths in light emitted from a light source. Here, while the target site is being illuminated with the second pulsed light source, a fluorescence signal emitted in response to excitation by the first pulsed light signal can be detected. When fluorophores are excited, they can emit light for a short duration of time. At 1006, while the in vivo target site 1100 is illuminated with the second pulsed light source, a first fluorescence corresponding to the first pulsed light source can be detected.

Alternatively, at 1006, a first reflection signal can be emitted from the in vivo target site and detected when the first pulsed light source site is in an "off" state. Thus, while the target site is being illuminated with the second pulsed light source, a reflection signal emitted in response to excitation by the first pulsed light signal can be detected.

At 1004, the endoscope 102 can be controlled to illuminate the in vivo target site 1100 with second pulsed light 1106 that has a different color from the first pulsed light 1102. For example, at 1004, the light source 202 can provide green light from an LED to the in vivo target site 1100 in an "on" state. Moreover, at 1004, the first pulsed light source is in an "off" state.

In the second illustration, as the in vivo target site 1100 is being illuminated with the second pulsed light source while the first pulsed light source is in an "off" state, at 1006, energy absorbed by the in vivo target site surface 1104, generically shown as energy 1200 in FIG. 12, can be emitted as first fluorescence signal 1202. In the second illustration, the first fluorescence signals 1202 can correspond to a wavelength emitted from the in vivo target site surface 1104. When the in vivo target site surface 1104 is illuminated with the first pulsed light 1102, the in vivo target site surface 1104 can become energized and resulting first fluorescence response signals 1202 can be detected that can correspond to a wavelength emitted from the energized in vivo target site surface 1104. In the second illustration, the first fluorescence signal 1202 can be transmitted to the feedback analyzer 121 via the optical path 209.

At 1008, the target site can be illuminated with a third pulsed light source in an "on" state of the third pulsed light source, for example, illuminating using the color blue. At 1008, the second pulsed light source that illuminated the target site at 1004 can be in an "off" state. Similarly, at 1008, the first pulsed light source that illuminated the target site at 1002 can be in an "off" state.

During, before, or after 1008, at 1010 a second fluorescence signal emitted from the target site can be detected when the second pulsed light source site is in an "off" state, in response to illumination from the second pulsed light source. The fluorescence signal can be emitted from the target site while the target site is being illuminated with the third pulsed light source. At 1010, while the in vivo target site 1100 is illuminated with the third pulsed light source, a second fluorescence corresponding to the second light pulse light source can be detected.

Alternatively or additionally, at 1010, a second reflection signal can be emitted from the in vivo target site and detected when the second pulsed light source site is in an "off" state. Thus, while the target site is being illuminated with the third pulsed light source, a reflection signal emitted in response to excitation by the second pulsed light signal can be detected.

After the third pulsed light source is switched to an "off" state (and while the first pulsed light source is switched to the "on" state), at 1012, a third fluorescence signal emitted from the target site can be detected when the third pulsed light source site is in an "off" state. In examples, the fluorescence signal is generated due to excitation from the second pulsed light source. Besides the third fluorescence signal, at 1012, a third reflection signal can be emitted from the in vivo target site and detected when the third pulsed light source site is in an "off" state.

At 1018, the endoscope 102 can be controlled to illuminate the in vivo target site 1100 (FIG. 11) with third pulsed light 1108, such as blue light. At 1008, the light source 202 can provide blue light from an LED to the in vivo target site 1100 in an "on" state, with the first and second pulsed light sources in an "off" state.

As the in vivo target site 1100 is being illuminated with the third pulsed light 1108 while the first and second pulsed light sources are in an "off" state, at 1010, the energy 1200 absorbed by the in vivo target site surface 1104 when the in vivo target site 1100 was illuminated with the pulsed light 1106 can be emitted as second fluorescence signal 1204, which can correspond to a wavelength emitted from the in vivo target site surface 1104 in response to being excited by the second pulsed light 1106. Thus, when the in vivo target site surface 1104 is energized, the fluorescence signals can correspond to a wavelength emitted from the energized in vivo target site surface 1104 in response to being illuminated by the second pulsed light 1106. In the second illustration, the second fluorescence signal 1204 can be transmitted to the feedback analyzer 121 via the optical path 209.

After the second fluorescence signal has been detected at 1010, at 1012, a third fluorescence signal 1206 can be detected. Specifically, the third fluorescence signal 1206 can correspond to a wavelength emitted from the in vivo target site surface 1104 in response to being excited by the second pulsed light 1106. Accordingly, when the in vivo target site surface 1104 is energized, the fluorescence signal can correspond to a wavelength emitted from the energized in vivo target site surface 1104 in response to being illuminated by the third pulsed light 1108. In the second illustration, the third fluorescence signals 1206 can be transmitted to the feedback analyzer 121 via the optical path 209.

While the approach 1000 in FIG. 10 depicts detections of the first, second, and third fluorescence signals, it may suffice to detect one or two of these signals to determine one or more target characteristics. For example, it may be sufficient to utilize the first fluorescence signal alone or a combination of the first and third fluorescence signals to determine the target characteristic(s). After the first (and in some embodiments, the second, and third) fluorescence signals are detected at 1012, at 1014, a fluorescence property associated with the detected signal(s) can be determined. For example, a spectra associated with the first, second, and/or third fluorescence signals can be determined, such as using the feedback analyzer 121. Alternatively, at 1014 a reflectance or other illumination response property associated with the detected illumination response signal(s) can be determined.

After determining a fluorescence property or spectra associated with the first, second, and/or third fluorescence signals at 1014, at 1016, a characteristic of the target site can be identified using the fluorescence property or spectra. At 1016, to identify a characteristic of the target site, the target detector 304 can extract one or more target fluorescence properties and/or reflectance features from the detected fluorescence signals and/or reflectance spectrum determined at 1014. The target detector 304 can identify the characteristic of the target site as a calculus structure if the target fluorescence property and/or reflectance feature exceeds a feature threshold or falls within a value range by comparing the fluorescence property and/or reflectance feature with the property and/or feature threshold or the value range. The target detector 304 can identify the characteristic of the target site as kidney tissue if the target fluorescence property and/or reflectance feature falls below the property and/or feature threshold or falls outside the value range. The property and/or feature threshold or value range can be determined using the calculi fluorescence properties and/or reflectance features and the tissue fluorescence properties and/or reflectance features. Moreover, the fluorescence property and/or feature threshold or the value range can be stored in a lookup table at the platform 104. The fluorescence property and/or feature threshold can be determined as one that separates the calculi fluorescence properties and/or reflectance features and the tissue fluorescence properties and/or reflectance features with a specified margin.

At 1016, the target detector 304 can trend one or more of the fluorescence properties and/or reflectance intensities of the characteristic at a target site over a range of wavelengths and identify the characteristic based on the trend of the one or more fluorescence properties (or the "fluorescence trend") and/or the reflectance intensities (or the "reflectance trend"), such as previously described above Returning to the second illustration, at 1014, the first, second, and/or third fluorescence signals 1202-1206 detected at 1006, 1010, and 1012 are transmitted to the feedback analyzer 121, which determines that a fluorescence property or spectra of the tissue at the in vivo site has a spectra of 460 nm to 700 nm when illuminated with a light source in a range of, for example, 450 nm to 500 nm. In the second illustration, each of the first, second, and third fluorescence signals 1202-1206 can be stored and then simultaneously transmitted to the feedback analyzer 121. Moreover, at 1016, similar to the first illustration, in the second illustration, the feedback analyzer 121 identifies the tissue at the in vivo site as being cancerous based on, for example, shapes and peak locations of the spectra.

After the characteristic at the target site is identified at 1016, at 1018, an apparatus, such as a treatment device, can be controlled based on the identification of the characteristic during. In examples, controlling the apparatus can include adjusting various parameters of the apparatus, such as an energy of the laser pulse, pulse frequency, laser power, and a pulse mode when the apparatus includes a laser. Furthermore, 1018 can be performed in real-time, where one or more parameters of the apparatus can be adjusted during a in vivo procedure in order to remove tissue, stone, or any other type of detritus from a in vivo site.

In examples, if the tissue at the in vivo site is deemed cancerous, the controller 310 can control the laser to deliver a laser beam that can remove the cancerous tissue. Returning to the second illustration, here, the material removal device 501 is a Nd:YAG laser. Additionally, as noted above, the feedback analyzer 121 identified the tissue at the in vivo site as being cancerous based on shapes, peak locations or other properties of the spectra. Thus, at 1016 in the second illustration, the automatic controller 310 automatically controls the material removal device 501 to emit a laser beam at a specific wavelength (e.g., 1064 nm) to remove the cancerous tissue at the in vivo target site 500. Upon completion of 1018, the method 1000 is complete. Alternatively, operations 1002-1018 may iteratively be performed until a treatment effect is achieved (e.g., when a kidney stone is completed fragmentated or dusted).

As explained, the light source can be controlled to emit light at different wavelengths. One or more optical filters can be used to filter the sensed fluorescence signals, such as to permit use of a single or shared light pulse. For example, optical filtering techniques may be used to filter wavelengths associated with the second and third wavelengths thereby only allowing transmission of fluorescence signals associated with the first wavelength. Likewise, optical filtering techniques can be used to filter wavelengths associated with the first and third wavelengths thereby only allowing transmission of fluorescence signals associated with the first wavelength. In addition, optical filtering techniques can be used to filter wavelengths associated with the first and second wavelength thereby only allowing transmission of fluorescence signals associated with the third wavelength. Therefore, a light source can emit light at the first, second, and third wavelengths, and optical filtering techniques can be used to filter fluorescence signals associated with each of the first, second, and third wavelengths. Moreover, a spectra along with a characteristic based on the spectra can be determined based on the filtered wavelengths to control a treatment device, such as discussed above. For example, hardware, such as a wavelength filter, can be used to filter fluorescence signals associated with each of the first, second, and third wavelengths. Furthermore, a hardware device can be programmed with software that provides the hardware with the functionality to filter fluorescence signals associated with each of the first, second, and third wavelengths.

The method 1000 can be performed during a first time period during which a characteristic at the in vivo target site 500 is determined and the material removal device 501 is controlled in real time based on the determination. During a second time period, the method 1000 can be repeated during which a characteristic at the in vivo target site 500 is determined and the material removal device 501 can be controlled in real time based on the determination. The determined characteristic can change between the first and second time periods. The laser can be controlled in real time based on the change, or based on the identification of characteristic during the second time period.

For example, the laser can be controlled by making a second adjustment to adjust one or more laser parameters of a laser, such as an energy of the laser pulse, pulse frequency, laser power, and a pulse mode. The parameter adjusted after the first time can be a different parameter than the parameter adjusted after the second parameter, as explained above.

Real-Time Control of Individual Laser Modules Based on Target Characteristic

A system for performing a medical procedure (e.g., ablation of a target) at a target site is now described. The system can include multiple laser modules having different wavelengths of light emissions. A controller can be configured for controlling activation and/or deactivation of the laser modules, such as based on one or more characteristics of the target. Fluorescence response light from the target, in response to illumination by one or more of the laser modules, can be used to determine a characteristic of the target site. A feedback analyzer can be used to determine a spectra of the emitted fluorescence response signal to determine a characteristic of the target.

The different wavelengths emitted by the different laser modules may have different penetration depths in the body and/or may remove different types of targets at different rates. Therefore, by selectively activating and/or deactivating one or more of the laser modules based on the determined characteristic(s) of the target at the in vivo site, the treatment effect of the target at the in vivo site may be adjusted or optimized. Light emitted from the selectively activated laser modules can be directed to a laser light combiner. The laser light combiner can combine the light from an output of each activated laser module and can direct the combined output to the in vivo target site (e.g., via an optical passageway). The light energy output from the combiner can be used to ablate a target at the in vivo target site. Thus, the controller can control which of the laser modules should emit light, based on the characteristic(s) of the tissue at the in vivo target site, which can be acquired before or during the laser procedure. At a first time, the controller can activate a first combination of laser modules to emit light based on the characteristic of target at the in vivo target site determined by the feedback analyzer at the first time (which may be before or during the laser procedure). At a later second time, the controller can control a second combination of laser modules—which can be different from the first combination of laser modules—to emit light based on a change in (or a changed) characteristic of target at the in vivo target site, such as can be determined by the feedback analyzer at the second time.

Figure 13A:
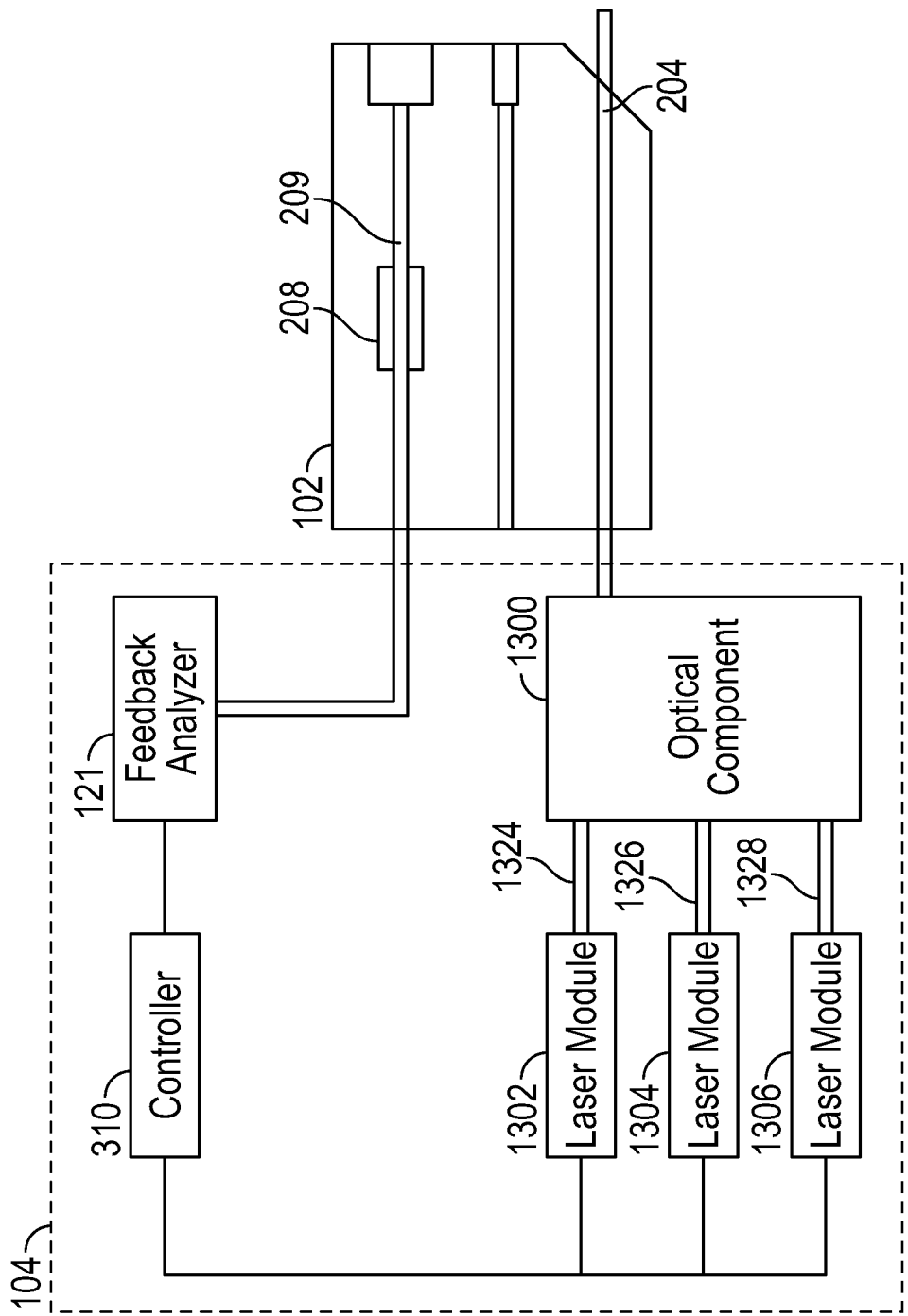
FIGS. 13A and 13B show components of an imaging platform in the system of FIG. 1.

FIG. 13A shows an example of components of the platform 104 in greater detail. The platform 104 can include an optical component 1300, which can be optically coupled to respective outputs of the laser modules 1302-1306. For example, the optical component 1300 include an optical combiner that can combine light output from the laser modules 1302-1306. The platform 104 can also include the light source 202 along with the feedback analyzer 121 and the controller 310.

The laser modules 1302-1306 can be similar to the material device 501 discussed above, such as can include a thulium fiber laser, a YAG, a holmium:YAG. The controller 310 can control individual ones of the laser modules 1302-1306, such as based on an ablation depth of the target or other characteristic of a target. The controller 310 can activate a combination of the laser modules 1302-1306 and deactivate a combination of the laser modules 1302-1306, such as based on an ablation depth or other characteristic of the target. This can be helpful in examples in which individual ones of the laser modules 1302-1306 can ablate tissue at the target at different rates.

Figure 13B:
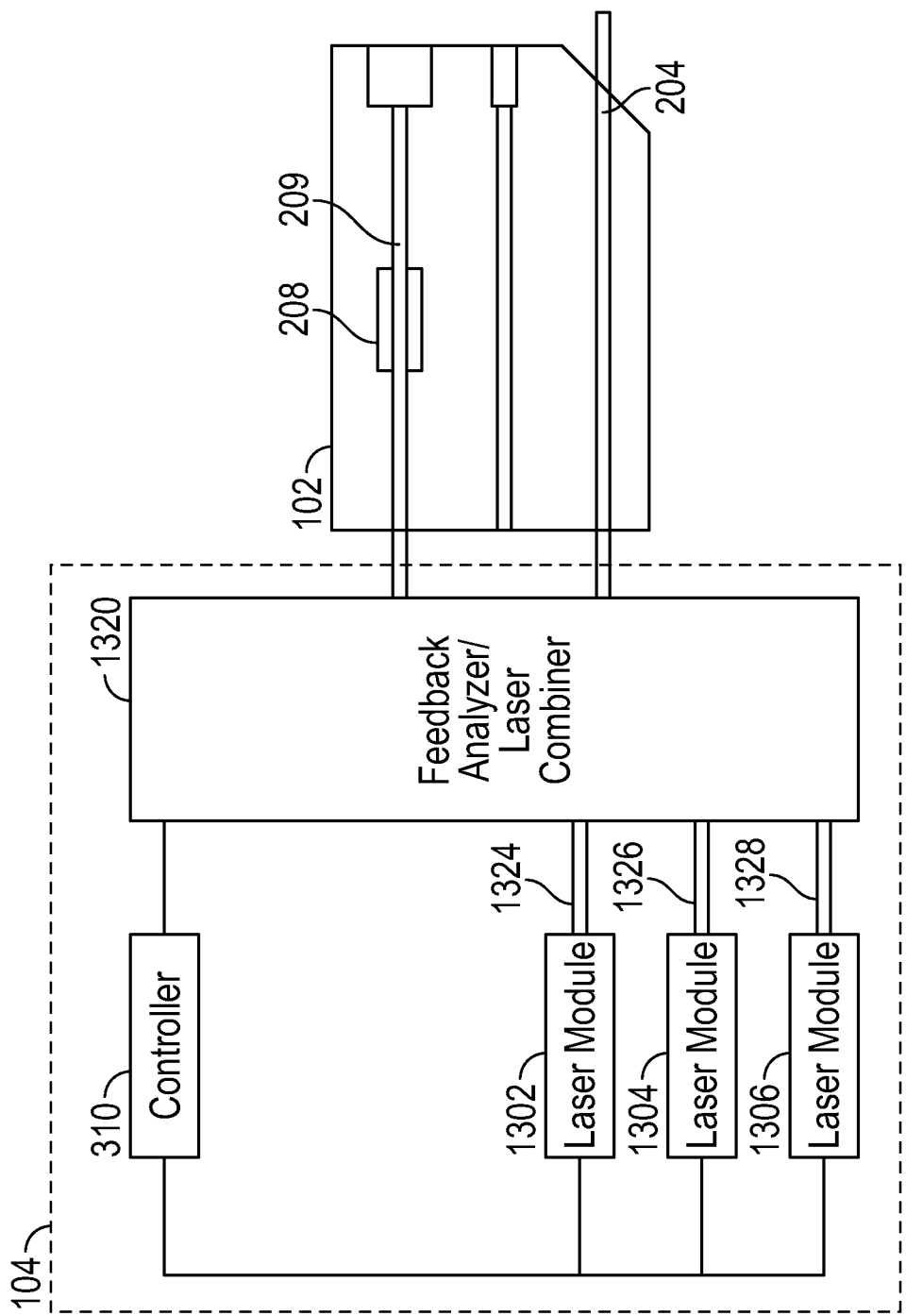

Each of the laser modules 1302-1306 can be optically coupled with the optical component 1300, such as via optical fibers 1324-1328, which can be similar to the optical fiber 204 discussed above. The optical component 1300 can combine the laser output from each of the laser modules 1302-1306. The optical fibers 1314-1318 can be coupled together at the optical component 1300, which can be combined with the feedback analyzer 121, such as shown platform 104 in FIG. 13B. platform 104

Figure 14:
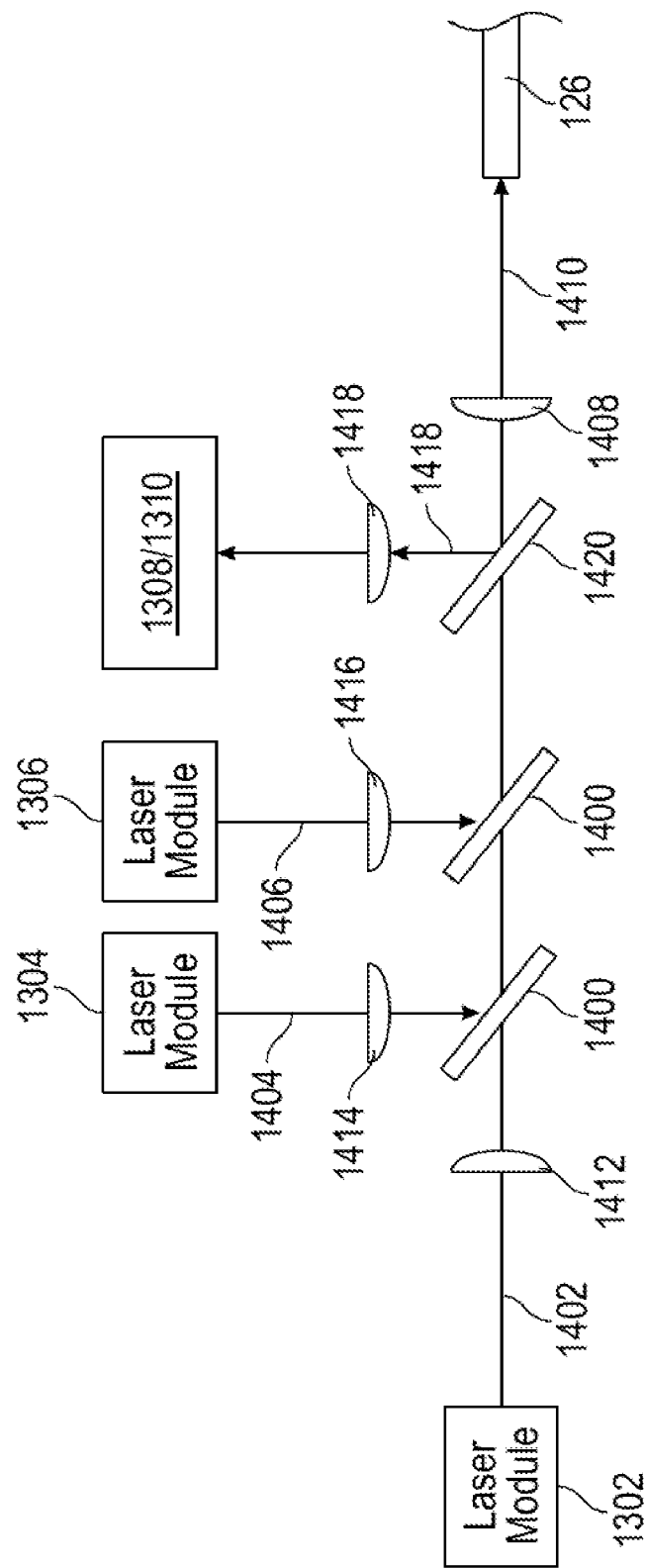
FIG. 14 illustrates a laser combiner of the imaging platform in the system of FIG. 1.

FIG. 14 shows an example in which the optical component 1300 can include optical assembly 1401. Here, the optical component 1300 can include first dichroic mirrors 1400 disposed at and oblique angle, such as 45°, relative to laser output beam paths 1402-1406 received from each of the laser modules 1302-1306. Individual ones of the first dichroic mirrors 1400 can reflect light from the laser beam paths 1402-1406 emitted from each of the laser modules 1302-1306 toward or along the optical path 126, such as to form a combined laser beam 1410 via the dichroic mirrors 1400. Moreover, the lens 1408 can focus the combined laser beam 1410 from the laser modules 1302-1306 toward or along the optical path 126. The combined laser beam 1410 can include any combination of the laser beams 1402-1406, such as only the laser beam 1402, only the laser beam 1404, or only the laser beam 1406. Moreover, the combined laser beam 1410 can include a combination of the laser beam 1402 and 1404, a combination of the laser beams 1402 and 1406, or a combination of the laser beams 1404 and 1406. The optical component 1300 can also include lenses 1412, 1414, 1416, 1418, which can be located such as to direct the laser beams 1402-1406 toward the first dichroic mirrors 1400.

Additionally, the optical component 1300 can also provide a fluorescence response signal 1418 from the in vivo target site to the feedback analyzer 121, such as similarly described above. The fluorescence response signal 1418 can be provided to the optical component 1300 from the endoscope 102 via the optical path 126. The fluorescence signal 1418 can be focused or otherwise directed by a lens 1408 towards a second dichroic mirror 1420. The second dichroic mirror 1420 can be disposed at an oblique angle, such as 45°, relative to the lens 1408 and/or the feedback analyzer 121 (not shown in FIG. 14). Here, the dichroic lens 1420 is in a path of the fluorescence signal 1418 and can direct the fluorescence signal 1418 towards photodetector 208 and/or the feedback analyzer 121, such as for determining a composition of tissue at a in vivo target site illuminated by the combined laser beam 1410, such as explained above with respect to FIGS. 4 and 10.

Figure 15:
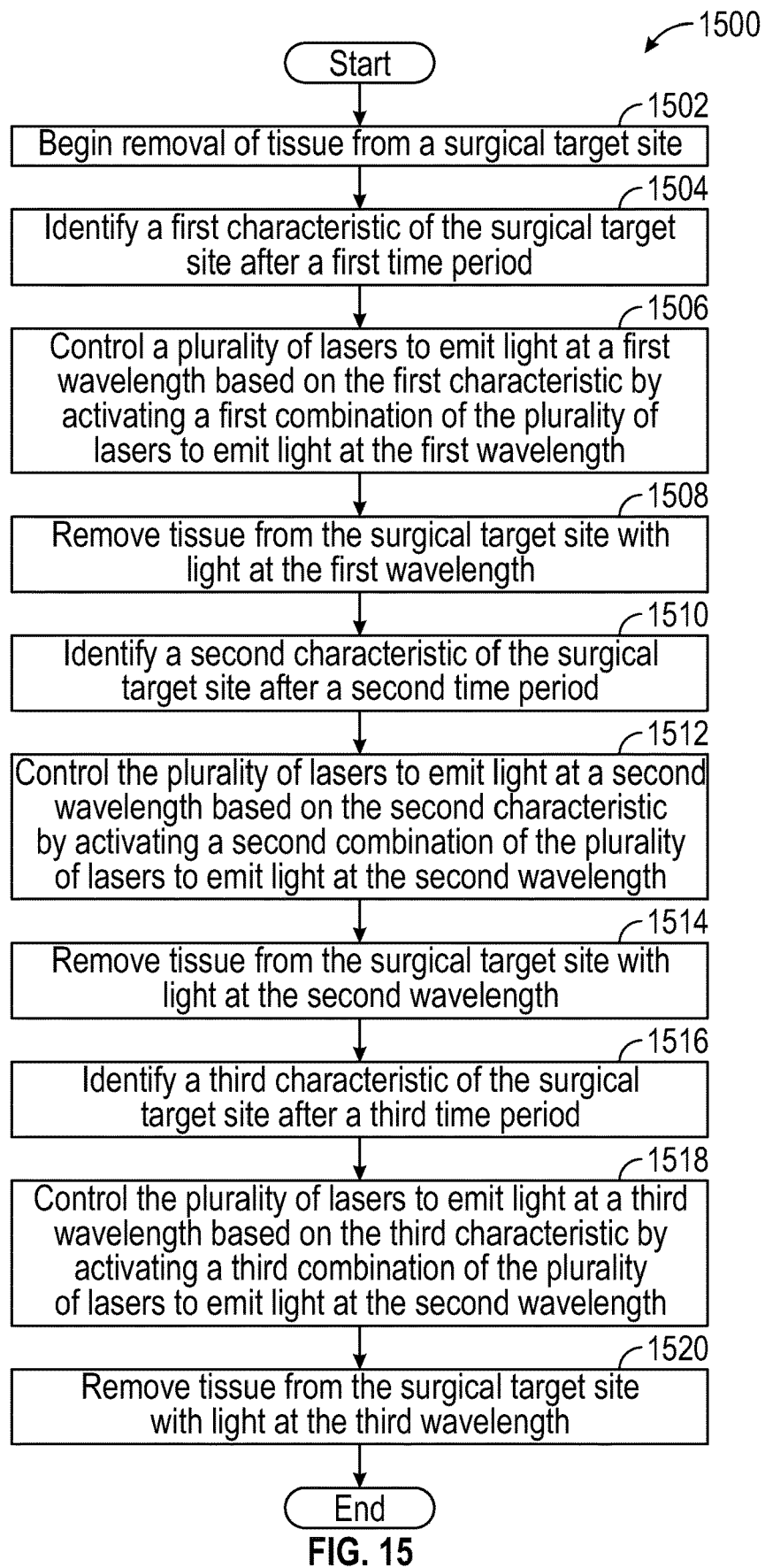
FIG. 15 shows a method of controlling a system for removing tissue from a in vivo target site in real time.

FIG. 15 shows an example of portions of a method 1500 of controlling a system for removing tissue from a target site, such as in real time. At 1502, tissue can be initially removed from a target site during an ablation procedure. The tissue can include soft tissue or hard tissue, such as kidney stones. One or any combination of the laser modules 1302-1304 can be a laser source and can provide a laser beam that can be used to ablate tissue from a target site, such as tissue from a cancerous in vivo target site or a kidney stone at a in vivo target site. One or any combination of the laser modules 1302-1304 can be selected by a practitioner based on the type of tissue being removed from a in vivo target site.

At 1504, after a first time period, a first characteristic of the target site can be identified. As tissue is removed from the target site at 1502, the ablation depth or other characteristic of the tissue being removed can change. For example, during a first time period, highly vascular tissue can be removed, leaving less vascular tissue to be removed, which can benefit from using different wavelengths of light that can be more efficient at removing different types of tissue. In addition, different wavelengths can have different penetration depths. For example, a Nd:YAG laser emitting light at a wavelength of 1064 nm can efficiently remove highly vascular tissue. However, light at this wavelength can be less suitable at removing less vascular tissue. Instead, ultraviolet visible (UV-VIS) GaN emitting semiconductor lasers having an emission in range of 515-520 nm or UV-VIS $In_xGa_{1-x}N$ emitting semiconductor lasers having an emission in a range of and 370-493 nm can efficiently remove less vascular tissue.

At 1506, a plurality of laser modules can be controlled by the controller 310 to emit light at a first wavelength based on the first characteristic determined at 1504. Thus, if at 1504 a characteristic of the target site has changed, at 1506 the light output from a plurality of laser modules can be controlled such that the emitted light is at a first wavelength such as to more efficiently or more controllably remove tissue.

At 1508, tissue can be removed from the target site with emitted light at the first wavelength, such as by controlling the light output from the plurality of laser modules at 1506.

FIG. 16 shows a "third illustration" in which, at 1502, the optical component 1300 emits light beams 1600 towards a in vivo target site 1602 that includes a highly vascular surface. Accordingly, the light beams 1600 have an initial wavelength of 1064 nm such as can be emitted by the laser module 1302, operating alone, while the laser modules 1304 and 1306 are in an off state.

FIG. 17 shows the same "third illustration" in which a first characteristic of the in vivo target site 1602 can be determined at 1504 by emitting pulsed light 1700 from the light source 202 towards a surface 1702 of the in vivo target site 1602, such as after a first time period of ablating at in vivo target site 1602, similarly to described above at 402 and FIG. 5.

Figure 18:
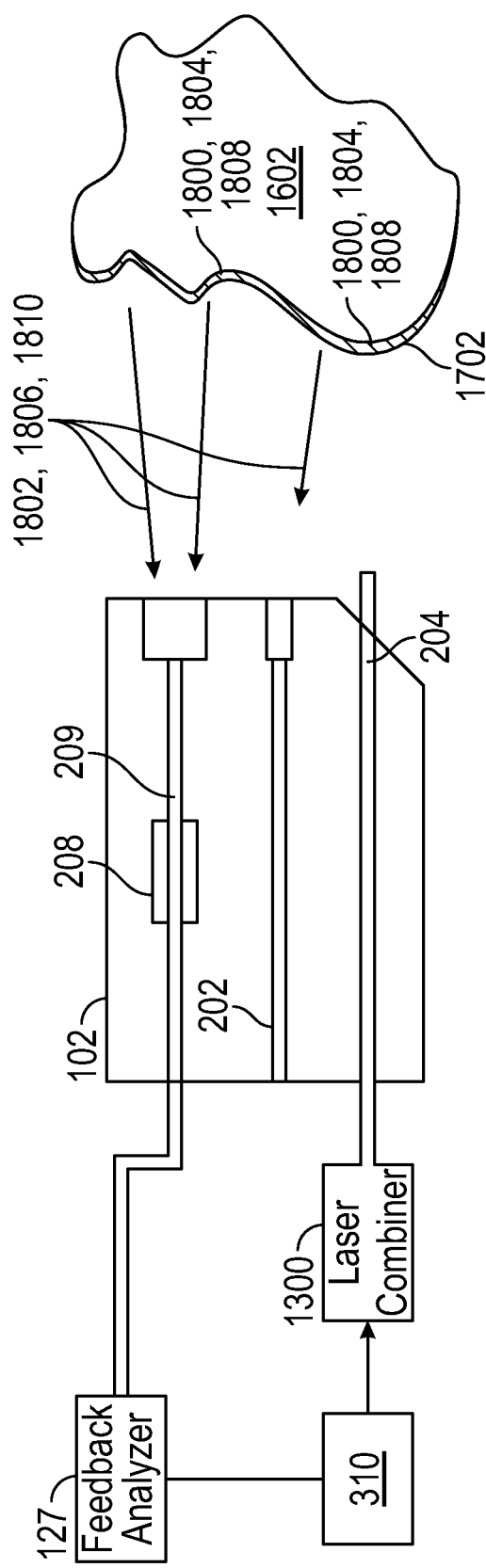
FIG. 18 shows the emission and sensing of fluorescence signals from a in vivo target site.

FIG. 18 shows the same "third illustration" in which, at 1504, energy absorbed by the in vivo target site surface 1702 results in emission of a fluorescence response signal 1802 from the in vivo target site surface. The fluorescence signals 1802 can be transmitted to the feedback analyzer 121 via the optical path 209. The feedback analyzer 121 can determine a first characteristic, for example, that the tissue at the in vivo target site surface 1702 has little vascularity, such as similarly described above at 406 and 408. Since the vascularity of the in vivo target site 1602 has changed during the first time period of ablation, the laser controller 310 can adjust the light emitted from the optical component 1300 such as to emit light at a wavelength of 532 nm when a Nd:YAG green laser is used to more efficiently or otherwise more suitably remove less vascular tissue. At 1506, the laser controller 310 can adjust the light emitted from the optical component 1300 in response to the changed tissue composition at the in vivo target site 1602 in real time, such as by deactivating the laser module 1302 and activating the laser modules 1304 and 1306 and, at 1508, using this changed configuration to deliver light to remove tissue from the in vivo target site 1602.

Further lasers that can be used to remove vascular tissue are shown below with reference to Table I:

TABLE I

| Laser | Wavelength $\lambda$ (nm) | Absorption Coefficient $\mu_\delta$ (cm$^{-1}$) | Optical Penetration Depth $\delta$ (μm) |
| --- | --- | --- | --- |
| Thulium fiber laser: | 1908 | 88/150 | 114/67 |
| Thulium fiber laser: | 1940 | 120/135 | 83/75 |
| Thulium:YAG: | 2010 | 62/60 | 161/167 |
| Holmium:YAG: | 2120 | 24/24 | 417/417 |
| Erbium:YAG: | 2940 | 12.000/1.000 | 1/10 |

At 1510 in FIG. 15, a second characteristic of the in vivo target site is identified during or after removing low vascularity tissue from the in vivo target site during a second time period at 1508, which can change the characteristic of the tissue being removed, such as when more highly vascular tissue is again encountered. The second characteristic of tissue at the in vivo target site can be determined, similar to that as described above at 402-408 of FIG. 4.

At 1512 a plurality of laser modules can be controlled by activating a second combination of the plurality of laser modules to emit light at the second wavelength based on the second characteristic, such as by activating and/or deactivating appropriate laser modules to produce light to more efficiently or otherwise more suitably remove tissue. Then, at 1514, tissue can be removed from the in vivo target site using emitted light at the second wavelength.

At 1510, a second characteristic of the in vivo target site 1602 can be determined by emitting pulsed light 1704 from the light source 202 towards the in vivo target site surface 1702, as shown in FIG. 17. The pulsed light 1704 can be emitted after a second time period during which the light beams 1604 are emitted towards the in vivo target site 1602, similar to that described above at 402 and FIG. 5. The absorbed response can result in an emitted fluorescence signal 1806 at an emission wavelength responsive to the illumination energy 1804. The fluorescence signal 1806 can be transmitted to the feedback analyzer 121 via the optical path 209. The feedback analyzer 121 can determine a second characteristic at the in vivo target site surface 1702, now having high vascularity, such as discussed above at 406 and 408.

Since the vascularity of the in vivo target site 1602 has changed during the second time period while the in vivo target site 1602 was subjected to the light beams 1604, the laser controller 310 adjusts (e.g., intra-procedure or even in real time) the light emitted toward the target site 1602 from the optical component 1300 such as to be more suitable or efficient at removing highly vascular tissue. Thus, at 1512, the laser controller 310 can adjust the light emitted from the optical component 1300 by activating the laser module 1302 and deactivating the laser modules 1304 and 1306. At 1514, once the laser controller 310 activates the laser module 1302 and deactivates the laser modules 1304 and 1306, tissue can be removed from the in vivo target site 1602 with light beams 1606 emitted from the laser module 1302, as shown in FIG. 16.

At 1516, a third characteristic of the in vivo target site is identified. At 1514, as tissue is removed from the in vivo target site during a third time period, the characteristic of the tissue being removed can change. During the third time period, vascular tissue with high vascularity can be removed. However, after the third time period, the laser beams being provided to the in vivo target site may have removed tissue having high vascularity such that tissue having low vascularity is now being removed. At 1512, a characteristic of the in vivo target site is determined after a third time period. The third characteristic of tissue at the in vivo target site can be determined as described above in FIGS. 4 and 402-408.

At 1518, a plurality of laser modules is controlled to emit light at a third wavelength based on the third characteristic. This can include activating a third combination of the plurality of laser modules to emit light at the third wavelength. Accordingly, if a determination is made at 1516 that a characteristic of the in vivo target site has changed, at 1518, the light output from a plurality of laser modules can be controlled such that the emitted light is at the third wavelength can more efficiently or otherwise more suitably remove tissue from the in vivo target site with emitted light at the third wavelength.

At 1516, a third characteristic of the in vivo target site 1602 can be identified by emitting pulsed light 1706 from the light source 202 towards the in vivo target site surface 1702, as shown in FIG. 17. The pulsed light 1706 can be emitted after a third time period during which the light beams 1606 are emitted towards the in vivo target site 1602, such as similar to that described above in 402 and FIG. 5.

In response to energy 1808 absorbed by the in vivo target site surface 1702, fluorescence response signals 1810 can be emitted from in vivo target site surface 1702 and transmitted to the feedback analyzer 121 via the optical path 209. The feedback analyzer 121 can determine a third characteristic where the tissue at the in vivo target site surface 1702 now has low vascularity, as discussed above at 406 and 408.

Since the vascularity of the in vivo target site 1602 has changed during the third time period while the in vivo target site 1602 was subjected to the light beams 1606, the laser controller 310 adjusts the light emitted from the optical component 1300, such as in real time in response to the changed characteristic at the in vivo target site 1702. Here, the light emitted from the laser module 1306 can be selected to efficiently remove the tissue currently at the in vivo target site surface 1702. Thus, the laser controller 310 can adjust the light emitted from the optical component 1300 by deactivating the laser module 1302 and the laser module 1304 and activating the laser module 1306 during at 1518. At 1520, once the laser controller 310 activates the laser module 1306 and deactivates the laser modules 1302 and 1304, tissue can be removed from the in vivo target site 1602 with light beams emitted from the laser module 1306.

In FIGS. 15-18, the characteristic related to the vascularity of tissue and adjusting light emitted from the optical component 1300 in response to the identified vascularity. Characteristics of tissue are not limited to a vascularity of tissue. Other examples can include being applied to kidney, pancreobiliary or gallbladder stones where the laser modules 1302-1306 ablate kidney, pancreobiliary or gallbladder stones and the characteristic relates to the characteristic of ablated kidney, pancreobiliary or gallbladder stones, the presence of kidney, pancreobiliary or gallbladder stones, and the like. Examples can also relate to other in vivo procedures involving the use of laser modules such as vaporizing tissue, such as during treatment of BPH.

Figure 19:
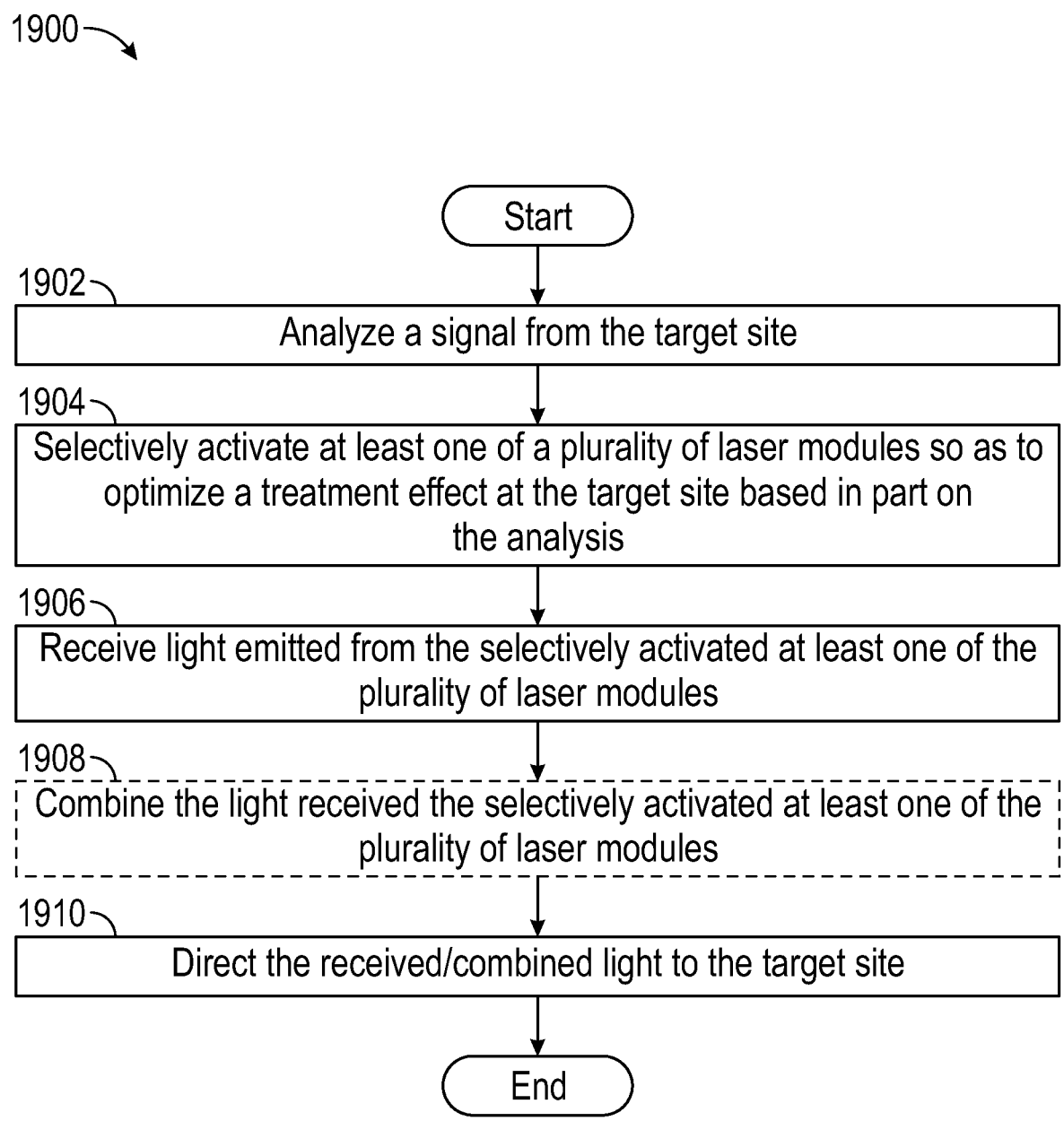
FIG. 19 shows a method of controlling a system for removing tissue from a in vivo target site.

FIG. 19 shows an example of portions of a method 1900 for controlling a system that includes a plurality of laser modules to treat a target site. At 1902, a signal from a target site can be analyzed, such as to determine a characteristic of the target site as discussed above. The signal can correspond to a depth of the target. As detailed above, the characteristic can include a type, material, composition, a composition profile, a structure, a hardness, or the like of the target site. The target site can be analyzed and the characteristic can be determined as discussed above with reference to FIG. 4 and the method 400 along with FIG. 12 and the method 1200.

At 1904, after the signal from the target site is analyzed to determine a characteristic associated with the target site, at least one laser module of the plurality of laser modules can be selectively activated in order to optimize a treatment effect at the target site. Either the laser controller 310, the controller 310, or the feedback analyzer 121 can selectively activate a specified group of one or more laser modules.

Figure 5:
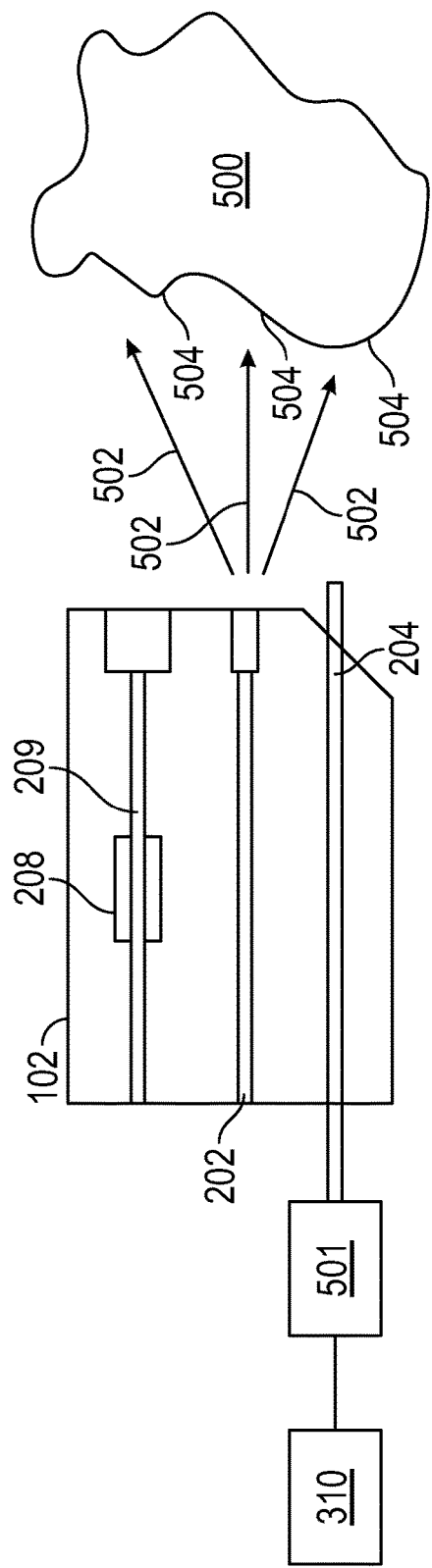
FIG. 5 illustrates an example of illuminating a target site, such as with pulsed light.

FIGS. 17 and 18 show a fourth illustration, in which the pulsed light 1700 is emitted similarly as in 402 along with the first illustration and FIG. 5. The energy 1800 absorbed by the in vivo target site surface 1702 can be emitted as the fluorescence signal 1802 as discussed above. At 1902, once the fluorescence signals 1802 are transmitted to the feedback analyzer 121, the feedback analyzer 121 can determine a first characteristic where the tissue at the in vivo target site surface 1702 has high vascularity such as discussed above at 406 and 408.

At 1904, in response to determining that the in vivo target site surface 1702 has high vascularity, the laser controller 310 can control the laser module 1302 to emit light beams at 1064 nm. Thus, only the laser module 1302 is activated and emitting light during the operation 1904 while the laser modules 1304 and 1306 remain deactivated in an off state.

At 1906, an optical component can receive the light emitted from the selectively activated at least one laser module. FIG. 13A shows an example of how, at 1906, the optical component 1300 can receive light emitted from the laser modules 1302-1306. Here, if only the laser module 1302 is activated and emits light while the laser modules 1304 and 1306 are deactivated and do not emit light, then the optical component 1300 will only receive light from the laser module 1302 during the operation 1906. Furthermore, if only the laser modules 1304 and 1306 are activated and emit light while the laser module 1302 is deactivated and does not emit light, then the optical component 1300 only receives light from the laser modules 1304 and 1306 during the operation 1906.

Optionally, at 1908, the optical component can combine light received from the selectively activated at least one of the plurality of laser modules. For example, if the laser modules 1304 and 1306 are activated and emit light while the laser module 1302 is deactivated and does not emit light, then the optical component 1300 will combine the light received from the laser modules 1304 and 1306 during the operation 1908. Alternatively, if only the laser module 1302 is activated and emits light while the laser modules 1304 and 1306 are deactivated and do not emit light, then the optical component 1300 will not perform the operation 1908 since the optical component 1300 is only receiving light from a single light source.

After either the optical component receives light emitted from the activated laser module at 1906 or the optical component combines receives light at 1908, at 1910, the received or combined light is directed to the target site.

In the fourth illustration, as noted above, only the laser module 1302 is emitting light while the laser modules 1304 and 1306 remain in an off state. Thus, at 1906, the optical component 1300 receives light from the laser module 1302. Since the optical component 1300 only receives light from the laser module 1302, 1908 is not performed and instead at 1910, the optical component 1300 can be controlled by the controller 310 to direct the light from the laser module 1302 towards the in vivo target site 1602.

The method 1900 can be continuously performed. At a time $T_1$, the feedback analyzer 121 determines a characteristic of a target site during at 1902 and the controller 310 activates and controls the laser module 1302 for treatment of the target site during at 1906 and 1910. At a time $T_2$, the feedback analyzer 121 determines a characteristic of the same target site at 1902 and the controller 310 deactivates the laser module 1302 and activates the laser modules 1304 and 1306. Moreover, at the time $T_2$, the optical component 1300 can receive light from the laser modules 1304 and 1306 at 1906 and at 1908, combine the received light. In addition, at 1910, the combined light can be directed towards the target site. This may be repeated for subsequent times $T_3$ through $T_N$.

As mentioned above, in addition to the signal corresponding to a characteristic of the target, the signal can correspond to a depth of the target. During treatment, the light emitted from laser modules can become too highly absorbed, therefore causing carbonization of tissue at the target site. This can occur if a practitioner has gone too deep into the target site. At 1902, the feedback analyzer 121 can analyze the signal to determine a depth of the tissue ablation within the target site. Techniques that can be used to determine a depth of a target can include absorption spectroscopy to determine the absorption coefficient within a broader wavelength ((Visible Infrared (VIS-IR)) which determines the depth at which light of a certain wavelength penetrates the target. Here, based on the depth, at 1904, the controller 310 can activate one of the laser modules 1302-1306 and, if necessary, deactivate one of the laser modules 1302-1306 based on the analyzed depth. In addition, the operations 1906 and 1910, along with the operation 1908, if necessary, can be performed.

Depth information relating to which laser module of the laser modules 1302-1306 should be activated and deactivated based on a target depth can be stored in memory at the controller 310. The depth information can identify combinations of the laser modules 1302-1306 to activate and deactivate based on a depth of the target. To further illustrate, at a first depth, the combination of the laser modules 1302 and 1306 should be activated while the laser module 1304 should be deactivated. At a second depth, the combination of the laser modules 1304 and 1306 should be activated while the laser module 1302 should be deactivated. The depth information relating to which combination of the laser modules 1302-1306 should be activated and which combination of the laser modules 1302-1306 should be deactivated can be stored in memory at the controller 310 before beginning a procedure.

Regarding FIGS. 15-19 and the methods 1500 and 1900 along with the third and fourth illustrations, since different laser modules of the laser modules 1302-1306 emit light at different wavelengths that can have different penetration depths and remove different types of targets at different rates, through selective activation and deactivation of the laser modules 1302-1306, a treatment effect of a target at a target site can be optimized or otherwise adjusted.

Figure 20:
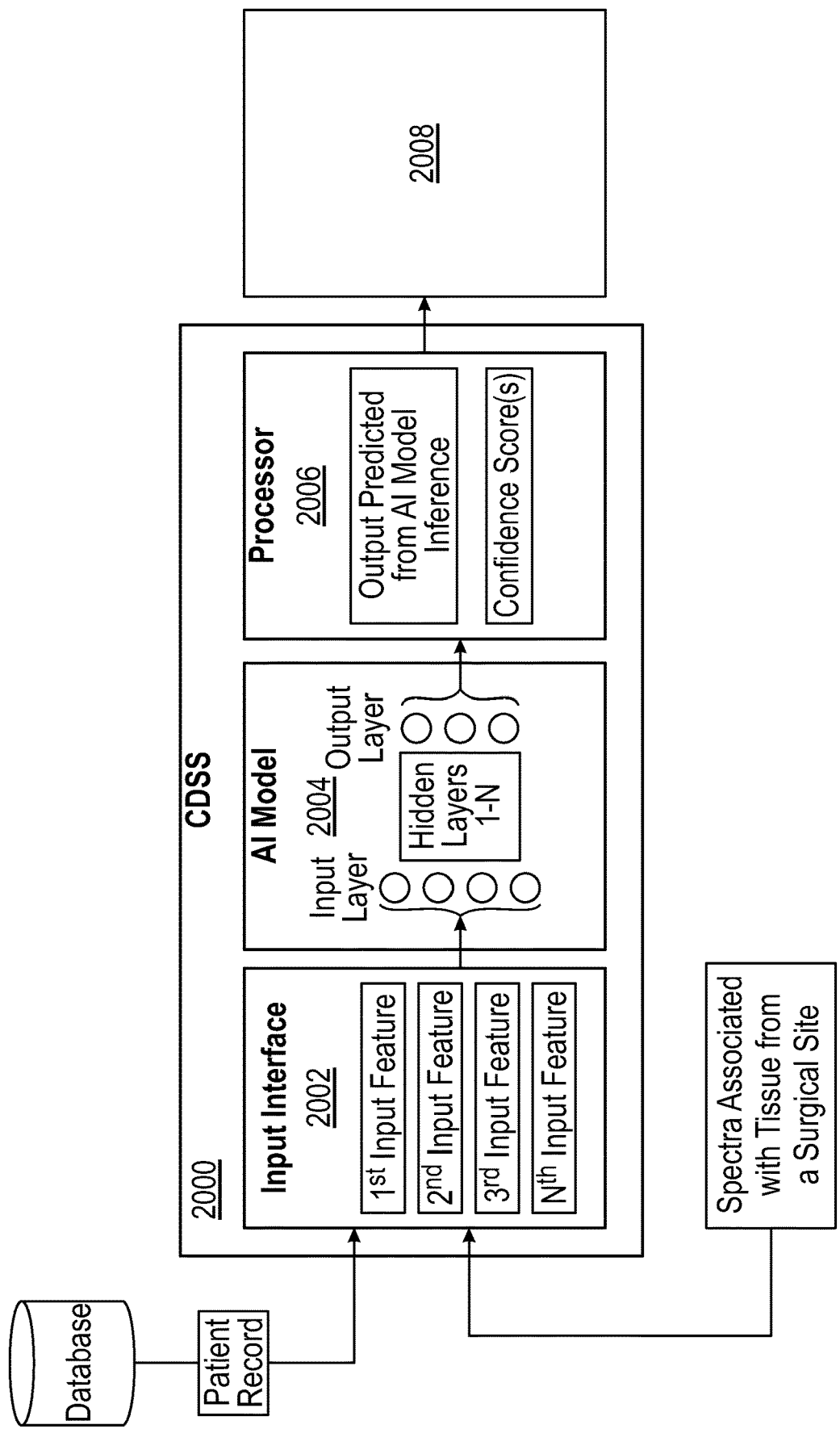
FIG. 20 is a schematic diagram of a computer-based clinical decision support system configured to determine a composition of tissue at a in vivo target.

FIG. 20 shows a schematic diagram of an example of a computer-based clinical decision support system (CDSS) 2000 that can be configured to control a plurality of lasers in real time based on determining changing compositions of tissue at a in vivo site. The CDSS 2000 can include an input interface 2002 through which spectra associated with tissue at a in vivo site, which is specific to a patient, are provided as input features to an artificial intelligence (AI) model 2004, where, in conjunction with a processor 2006, a composition of the tissue at the in vivo site is output. An inference operation in which the spectra associated with tissue at a in vivo site can be applied to the AI model in order to generate an output 2008 describing the composition of the tissue at the in vivo site, and a user interface (UI) through which the composition of the tissue at the in vivo site is communicated to a user, e.g., a clinician.

The input interface 1902 can also provide a tissue composition to the AI model 2004, where, in conjunction with the processor 1906, a combination of laser modules to be used to remove the tissue based on the tissue composition is output. An inference operation in which the tissue composition can be applied to the AI model to generate an output describing a combination of laser modules to use to remove tissue having the tissue composition. In some example, a UI can be used to communicate the laser module combination to a user, e.g., a practitioner.

The input interface 2002 can include a direct data link between the CDSS 2000 and one or more medical devices, such as the endoscope 102, that generate at least some of the input features. The input interface 2002 can transmit spectra associated with tissue at a in vivo target site directly to the CDSS 2000 during a therapeutic and/or diagnostic medical procedure. The input interface can transmit a tissue composition associated with a in vivo target site directly to the CDSS 2000 during a therapeutic and/or diagnostic medical procedure.

Additionally, or alternatively, the input interface 2002 can include a user interface that facilitates interaction between a user and the CDSS 2000. To further illustrate, the input interface 2002 can facilitate a user interface through which the user can manually enter spectra associated with tissue at a in vivo site. Additionally, or alternatively, the input interface 2002 can provide the CDSS 2000 with access to an electronic patient record from which one or more input features can be extracted. In any of these cases, the input interface 2002 is configured to collect one or more of the following input features in association with a specific patient on or before a time at which the CDSS 2000 is used to determine a composition of tissue at a in vivo site and provide a combination of laser modules. For example, the first input feature through the $n^{th}$ input feature can relate to spectra associated with tissue at a in vivo site at different time intervals. To further illustrate, the first input feature can correspond to spectra associated with tissue at a in vivo site at first time interval while the $n^{th}$ input feature can correspond to spectra associated with tissue at a in vivo site at $n^{th}$ time interval. In further examples, the first input feature through the $n^{th}$ input feature can relate to a tissue composition associated with tissue at a in vivo site at different time intervals. To further illustrate, the first input feature can correspond to tissue composition associated with tissue at a in vivo site at first time interval while the $n^{th}$ input feature can correspond to tissue composition associated with tissue at a in vivo site at $n^{th}$ time interval.

Based on one or more of the above input features, the processor 2006 can perform an inference operation using the AI model to generate a composition of the tissue at the in vivo site and suggest a combination of laser modules. For example, input interface 2002 can deliver the tissue composition associated with tissue at a in vivo site into an input layer of the AI model which propagates these input features through the AI model to an output layer. The AI model can provide a computer system the ability to perform tasks, without explicitly being programmed, by making inferences based on patterns found in the analysis of data. AI model explores the study and construction of algorithms (e.g., machine-learning algorithms) that can learn from existing data and make predictions about new data. Such algorithms operate by building an AI model from example training data in order to make data-driven predictions or decisions expressed as outputs or assessments.

Modes for machine learning (ML) can include: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Some tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some tasks for unsupervised ML include clustering, representation learning, and density estimation. Some examples of unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to centralized machine-learning techniques where all the local datasets are uploaded to one server, as well as to more decentralized approaches which can assume that local data samples are identically distributed. Federated learning enables multiple actors to build a common, robust machine learning model without sharing data, thus allowing to address critical issues such as data privacy, data security, data access rights and access to heterogeneous data.

In some examples, the AI model can be trained continuously or periodically before performing inference operation by the processor 2006. Then, during the inference operation, the patient specific input features provided to the AI model can be propagated from an input layer, through one or more hidden layers, and ultimately to an output layer that provides output corresponding to the composition of the tissue at the in vivo site. For example, when the output layer generates an output corresponding to the composition of the tissue at the in vivo site a system being used to ablate the in vivo site, such as the endoscope 102, the platform 104, the laser controller 122, the laser controller 310, or the laser 501, can be adjusted based on the composition to perform a in vivo procedure.

During and/or subsequent to the inference operation, the composition of the tissue at the in vivo site can be communicated to the user via the user interface (UI) and/or automatically cause the endoscope 102, the platform 104, the laser controller 122, the laser controller 310, or the laser 501 for performing a desired action such as ablation of the in vivo site.

Figure 21:
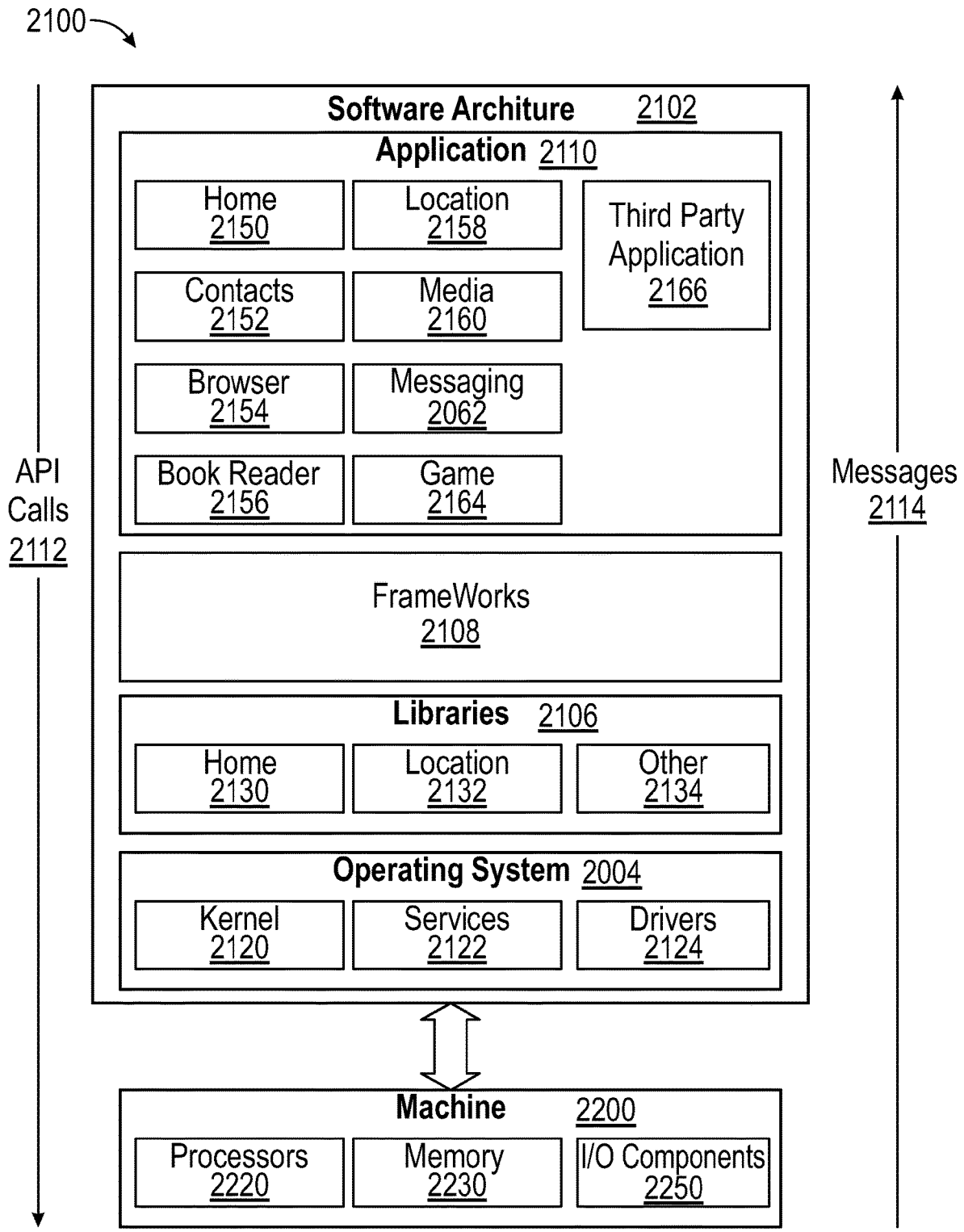
FIG. 21 is a block diagram illustrating an example of a software architecture that can be installed on a machine.

FIG. 21 is a block diagram 2100 illustrating an example of portions of a software architecture 2102, which can be installed on any one or more of the devices described above. The software architecture 2102 can be implemented by hardware such as a machine 2200 that includes processors 2210, memory 2230, and I/O components 2250. The software architecture 2102 can include a stack of layers where each layer can provide a particular functionality. For example, the software architecture 2102 includes layers such as an operating system 2104, libraries 2106, frameworks 2108, and applications 2110. Operationally, the applications 2110 invoke application programming interface (API) calls 2112 through the software stack and receive messages 2114 in response to the API calls 2112.

The operating system 2104 can manage hardware resources and provides common services. The operating system 2104 can include a kernel 2120, services 2122, and drivers 2124. The kernel 2120 can act as an abstraction layer between the hardware and the other software layers. For example, the kernel 2120 can provide memory management, processor management (e.g., scheduling), component management, networking, and security settings, among other functionality. The services 2122 can provide other common services for the other software layers. The drivers 2124 can be responsible for controlling or interfacing with the underlying hardware. For instance, the drivers 2124 can include display drivers, camera drivers, Bluetooth® drivers, flash memory drivers, serial communication drivers (e.g., Universal Serial Bus (USB) drivers), WiFi® drivers, audio drivers, power management drivers, and so forth.

In some implementations, the libraries 2106 provide a low-level common infrastructure that can be utilized by the applications 2110. The libraries 2106 can include a home library 2130 (e.g., C standard library) that can provide functions such as memory allocation functions, string manipulation functions, mathematic functions, and the like. In addition, the libraries 2106 can include API libraries 2132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 2106 can also include a wide variety of other libraries 2134 to provide many other APIs to the applications 2110.

The frameworks 2108 provide a high-level common infrastructure that can be utilized by the applications 2110, according to some implementations. For example, the frameworks 2108 provide various graphic user interface (GUI) functions, high-level resource management, high-level location services, and so forth. The frameworks 2108 can provide a broad spectrum of other APIs that can be utilized by the applications 2110, some of which can be specific to a particular operating system or platform.

The applications 2110 can include a home application 2150, a contacts application 2152, a browser application 2154, a book reader application 2156, a location application 2158, a media application 2160, a messaging application 2162, a game application 2164, and a broad assortment of other applications such as a third-party application 2166. The applications 2110 can include programs that execute functions defined in the programs. Various programming languages can be employed to create one or more of the applications 2110, structured in a variety of manners, such as object-orientated programming languages (e.g., Objective-C, Java, or C++) or procedural programming languages (e.g., C or assembly language). In a specific example, the third-party application 2166 (e.g., an application developed using the Android™ or iOS™ software development kit (SDK) by an entity other than the vendor of the particular platform) can be mobile software running on a mobile operating system such as iOS™, Android™ Windows® Phone, or other mobile operating systems. In this example, the third-party application 2166 can invoke the API calls 2112 calls 2112 provided by the mobile operating system (e.g., the operating system 2104) to facilitate functionality described herein.

Certain examples are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In examples, one or more computer systems (e.g., a standalone, client or server computer system) or one or more processors can be configured by software (e.g., an application or application portion) as a hardware-implemented module that operates to perform certain operations as described herein.

A hardware-implemented module can be implemented mechanically or electronically. For example, a hardware-implemented module can include dedicated circuitry or logic that is permanently configured (e.g., as a special-purpose processor, such as a field programmable gate array (FPGA) or an application-specific integrated circuit (ASIC)) to perform certain operations. A hardware-implemented module can also include programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor can be configured as respectively different hardware-implemented modules at different times. Software can, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiples of such hardware-implemented modules exist contemporaneously, communications can be achieved through signal transmission (e.g., over appropriate circuits and buses) that connects the hardware-implemented modules. In examples in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can include processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but also deployed across a number of machines. The processor or processors can be located in a single location (e.g., within a home environment, an office environment or as a server farm), or the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs).)

Portions can be implemented in digital electronic circuitry, or in computer hardware, firmware, software, or in combinations of them. Portions can be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and can interact through a communication network. The relationship of client and server arises by virtue of computer programs running on the respective computers and having a client-server relationship to each other. Using a programmable computing system, both hardware and software architectures can be used. Below are set out examples of hardware (e.g., machine) and software architectures that can be deployed.

Figure 22:
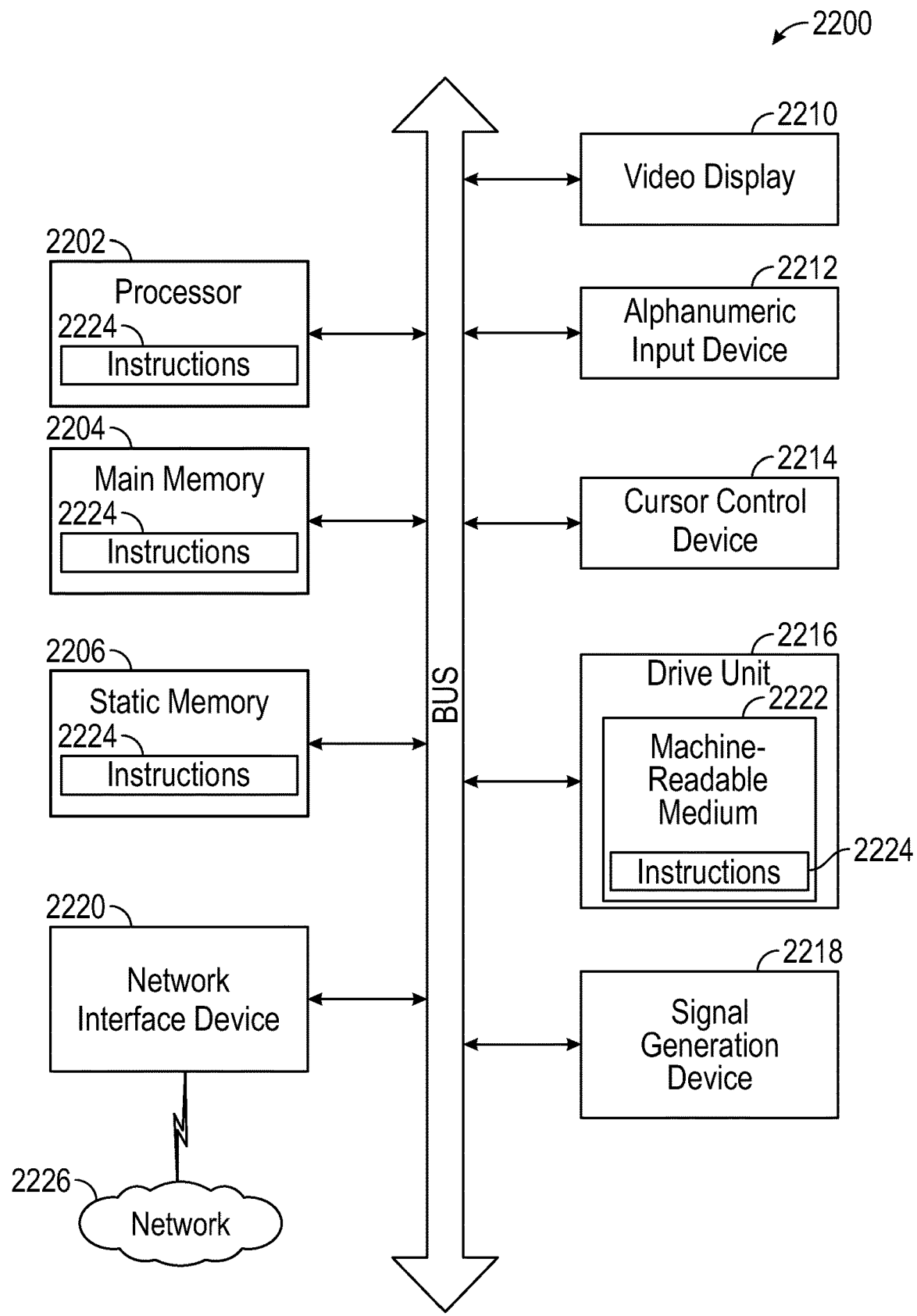
FIG. 22 is a diagrammatic representation of a machine in the form of a computer system within which a set of instructions can be executed for causing the machine to perform any one or more of the methodologies discussed herein.

FIG. 22 is a block diagram of a machine within which instructions can be executed for causing the machine to perform any one or more of the methodologies discussed herein. The machine can be any of the devices described above. The machine can operate as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example of a computer system 2200 includes a processor 2202 (e.g., a central processing unit (CPU), a graphics processing unit (GPU) or both), a main memory 2204 and a static memory 2206, which communicate with each other via a bus 2208. The computer system 2200 can further include a video display unit 2210 (e.g., a liquid crystal display (LCD) or a cathode ray tube (CRT)). The computer system 2200 also includes an alphanumeric input device 2212 (e.g., a keyboard), a user interface (UI) navigation device (cursor control device) 2114 (e.g., a mouse), a disk drive unit 2216 drive unit 2216, a signal generation device 2218 (e.g., a speaker) and a network interface device 2220.

The drive unit 2216 includes a machine-readable medium 2222 on which is stored one or more sets of instructions and data structures (e.g., software) 2124 embodying or utilized by any one or more of the methodologies or functions described herein. The instructions 2224 can also reside, completely or at least partially, within the main memory 2204 and/or within the processor 2202 during execution thereof by the computer system 2200, the main memory 2204 and the processor 2202 also constituting machine-readable media. Instructions 2224 can also reside within the static memory 2206.

While the machine-readable medium 2222 is shown in an example to be a single medium, the term "machine-readable medium" can include a single medium or multiple media (e.g., a centralized or distributed database, and/or associated caches and servers) that store the one or more instructions or data instructions 2224. The term "machine-readable medium" shall also be taken to include any tangible medium that is capable of storing, encoding or carrying instructions 2224 for execution by the machine and that cause the machine to perform any one or more of the methodologies of the present invention, or that is capable of storing, encoding or carrying data structures utilized by or associated with such instructions 2224. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 2224 can further be transmitted or received over a communications network 2226 using a transmission medium. The instructions 2224 can be transmitted using the network interface device 2220 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and WiMax networks). The term "transmission medium" shall be taken to include any intangible medium that is capable of storing, encoding or carrying instructions 2224 for execution by the machine, and includes digital or analog communications signals or other intangible media to facilitate communication of such software.

The above detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations.

What is claimed is:

1. A system comprising:
   a plurality of laser sources, wherein a first laser source of the plurality of laser sources is configured to emit light having a first wavelength range and a second laser source of the plurality of laser sources is configured to emit light having a second wavelength range different from the first wavelength range to an in vivo target site;
   an endoscope having a proximal portion and a distal portion, the distal portion being configured to be inserted into a location in proximity to the in vivo target site;
   a controller configured to:
   analyze a first signal from the in vivo target site to determine a first depth at the in vivo target site, wherein the first depth relates to a first penetration depth of first emitted light into the in vivo target site; and
   based at least in part on the first depth at the in vivo target site, selectively activate the first laser source so as to treat the in vivo target site; and
   wherein the controller is further configured to:
   receive a second signal from the in vivo target site;
   analyze the second signal to determine a second depth at the in vivo target site, wherein the second depth relates to a second penetration depth of second emitted light into the in vivo target site; and
   based at least in part on the second depth of the in vivo target site, selectively activate the second laser source so as to adjust a treatment effect at the in vivo target site.

2. The system of claim 1, the system further comprising at least one optical component, wherein one of the first laser source or the second laser source includes multiple laser sources and the at least one optical component is configured to:
   receive light emitted from selectively activated multiple laser sources;
   combine the light emitted from the selectively activated multiple laser sources; and
   direct the combined light to the in vivo target site.

3. The system of claim 2, further comprising a detector for detecting the first signal, wherein the at least one optical component comprises:
   a first reflector for merging (i) a first laser beam path between the first laser source and the in vivo target site and (ii) a second laser beam path between the second laser source and the in vivo target site; and
   a second reflector for redirecting the first signal from the in vivo target site towards the detector.

4. The system of claim 1, wherein the controller is further configured to
   selectively deactivate the first laser source based on the analysis of the second signal.

5. The system of claim 1, wherein the controller is further configured to:
   analyze the first signal to determine a distance between the endoscope and the in vivo target site; and
   based at least in part on the determined distance, selectively activate the second laser source so as to adjust a treatment effect at the in vivo target site.

6. The system of claim 1, wherein the controller is further configured to,
   based at least in part on the first signal, determine a distance between the endoscope and the in vivo target site within a patient's body.

7. A system comprising:
   a plurality of laser sources, wherein:
   individual ones of the plurality of laser sources are configured to emit light having different wavelengths to an in vivo target site;
   a first laser source of the plurality of laser sources is configured to emit light having a first wavelength range and a second laser source of the plurality of laser sources is configured to emit light having a second wavelength range different from the first wavelength range to the in vivo target site;
   an endoscope having a proximal portion and a distal portion, the distal portion being configured to be inserted into a location in proximity to the in vivo target site;
   a controller configured to:
   analyze a first signal from the in vivo target site to determine a first depth at the in vivo target site, wherein the first depth relates to a first penetration depth of first emitted light into the in vivo target site; and based at least in part on the first depth at the in vivo target site, selectively activate the first laser source so as to treat the in vivo target site;

wherein the controller is further configured to:
receive a second signal from the in vivo target site;
analyze the second signal to determine a second depth at the in vivo target site, wherein the second depth relates to a second penetration depth of second emitted light into the in vivo target site; and
based at least in part on the second depth of the in vivo target site, selectively activate the second laser source and cause the first emitted light to combine with second emitted light so as to adjust a treatment effect at the in vivo target site.

8. The system of claim 7, wherein:
selectively activating the second laser source causes light emitted from the first laser source to combine with light emitted from the second laser source; and
the signal corresponds to a distance between the endoscope and the in vivo target site and the controller is further configured to:
analyze the distance between the endoscope and the in vivo target site; and
based on the distance between the endoscope and the in vivo target site:
deactivate the selectively activated combination of laser sources; and
selectively activate a second combination of laser sources of the plurality of laser sources so as to adjust a treatment effect at the in vivo target site.

9. The system of claim 7, further comprising:
a detector for detecting the first signal; and
an optical component, wherein the optical component comprises:
a first reflector for merging (i) a first laser beam path between the first laser source and the in vivo target site and (ii) a second laser beam path between the second laser source and the in vivo target site; and
a second reflector for redirecting the first signal from the in vivo target site towards the detector.

10. A system comprising:
a plurality of laser sources, wherein a first laser source of the plurality of laser sources is configured to emit light having a first wavelength range and a second laser source of the plurality of laser sources is configured to emit light having a second wavelength range different from the first wavelength range to an in vivo target site;
an endoscope having a proximal portion and a distal portion, the distal portion being configured to be inserted into a location in proximity to the in vivo target site;
a controller configured to:
analyze a first signal from the in vivo target site to determine a first depth at the in vivo target site, wherein the first depth relates to a first penetration depth of first emitted light into the in vivo target site; and
based at least in part on the first depth at the in vivo target site, selectively activate the first laser source so as to treat the in vivo target site;
receive a second signal from the in vivo target site;
analyze the second signal to determine a second depth at the in vivo target site, wherein the second depth relates to a second penetration depth of second emitted light into the in vivo target site; and
based at least in part on the second depth of the in vivo target site, selectively activate the second laser source so as to adjust a treatment effect at the in vivo target site;
an optical component configured to:
receive light emitted from one of the first laser source or the second laser source; and
direct the received light to the in vivo target site.

11. The system of claim 10, wherein the controller is configured to;
determine a characteristic associated with the in vivo target site; and
selectively activate a first combination of laser sources of the plurality of laser sources based at least in part on the characteristic so as to adjust a treatment effect at the in vivo target site.

12. The system of claim 11, the system further comprising a detector for detecting the characteristic, wherein the optical component comprises:
a first reflector for merging (i) a first laser beam path between the first laser source and the in vivo target site and (ii) a second laser beam path between the second laser source and the in vivo target site; and
a second reflector for redirecting the first signal from the in vivo target site towards the detector.

* * * * *